United States Patent
Okabe

(10) Patent No.: US 9,983,454 B2
(45) Date of Patent: May 29, 2018

(54) DRIVING APPARATUS, DISPLAY DRIVER AND ELECTRONIC APPARATUS

(71) Applicant: Synaptics Japan GK, Tokyo (JP)

(72) Inventor: Shigeyuki Okabe, Tokyo (JP)

(73) Assignee: Synaptics Japan GK, Tokyo (JP)

(*) Notice: Subject to any disclaimer, the term of this patent is extended or adjusted under 35 U.S.C. 154(b) by 48 days.

(21) Appl. No.: 15/096,095

(22) Filed: Apr. 11, 2016

(65) Prior Publication Data

US 2016/0307536 A1 Oct. 20, 2016

(30) Foreign Application Priority Data

Apr. 17, 2015 (JP) .................................. 2015-084764

(51) Int. Cl.
| | |
|---|---|
| *G06F 3/038* | (2013.01) |
| *G09G 5/00* | (2006.01) |
| *G02F 1/1368* | (2006.01) |
| *G09G 3/20* | (2006.01) |
| *G09G 3/36* | (2006.01) |

(52) U.S. Cl.
CPC ......... *G02F 1/1368* (2013.01); *G09G 3/2092* (2013.01); *G09G 3/3611* (2013.01); *G09G 3/3696* (2013.01); *G09G 2310/0289* (2013.01); *G09G 2310/0291* (2013.01); *G09G 2370/08* (2013.01)

(58) Field of Classification Search
CPC .. G02F 1/1368; G09G 3/3696; G09G 3/3611; G09G 3/2092; G09G 2370/08; G09G 2310/0289; G09G 2310/0291
See application file for complete search history.

(56) References Cited

U.S. PATENT DOCUMENTS

| | | | | |
|---|---|---|---|---|
| 2003/0201959 A1* | 10/2003 | Sakaguchi | ........... | G09G 3/3696 345/87 |
| 2011/0109662 A1* | 5/2011 | Cho | ..................... | G09G 3/3688 345/690 |
| 2011/0242145 A1 | 10/2011 | Nishimura et al. | | |
| 2013/0329057 A1* | 12/2013 | Al-Dahle | ............... | H04N 17/00 348/189 |
| 2015/0187291 A1* | 7/2015 | Jang | ..................... | G09G 3/3611 345/694 |
| 2015/0206487 A1* | 7/2015 | Kim | ..................... | G09G 3/3614 345/96 |

* cited by examiner

*Primary Examiner* — Ilana Spar
*Assistant Examiner* — Brent D Castiaux
(74) *Attorney, Agent, or Firm* — Patterson + Sheridan, LLP

(57) ABSTRACT

The driving device used for drive control of a driven device having driven elements arranged to commonly receive a common voltage at common terminals and individually receive drive signals at data terminals has: a drive voltage-producing circuit which produces drive voltages; a driver circuit which accepts input of the drive voltages produced by the drive voltage-producing circuit and outputs, as drive signals, signals selected from the drive voltages according to drive data from data output terminals in parallel; and a common voltage-producing circuit which produces a common voltage to output from a common-voltage-output terminal. In the driving device, the drive voltage-producing circuit detects a change in the common voltage output from the common-voltage-output terminal, and changes the drive voltages in the direction of the change.

20 Claims, 10 Drawing Sheets

BROKEN LINE: WITH NO MEASURE TAKEN
SOLID LINE: WITH MEASURE TAKEN

FILLED CIRCLE: GAMMA CURVE VOLTAGE
SOLID LINE: GRADATION VOLTAGE SUBJECTED TO GAMMA CORRECTION

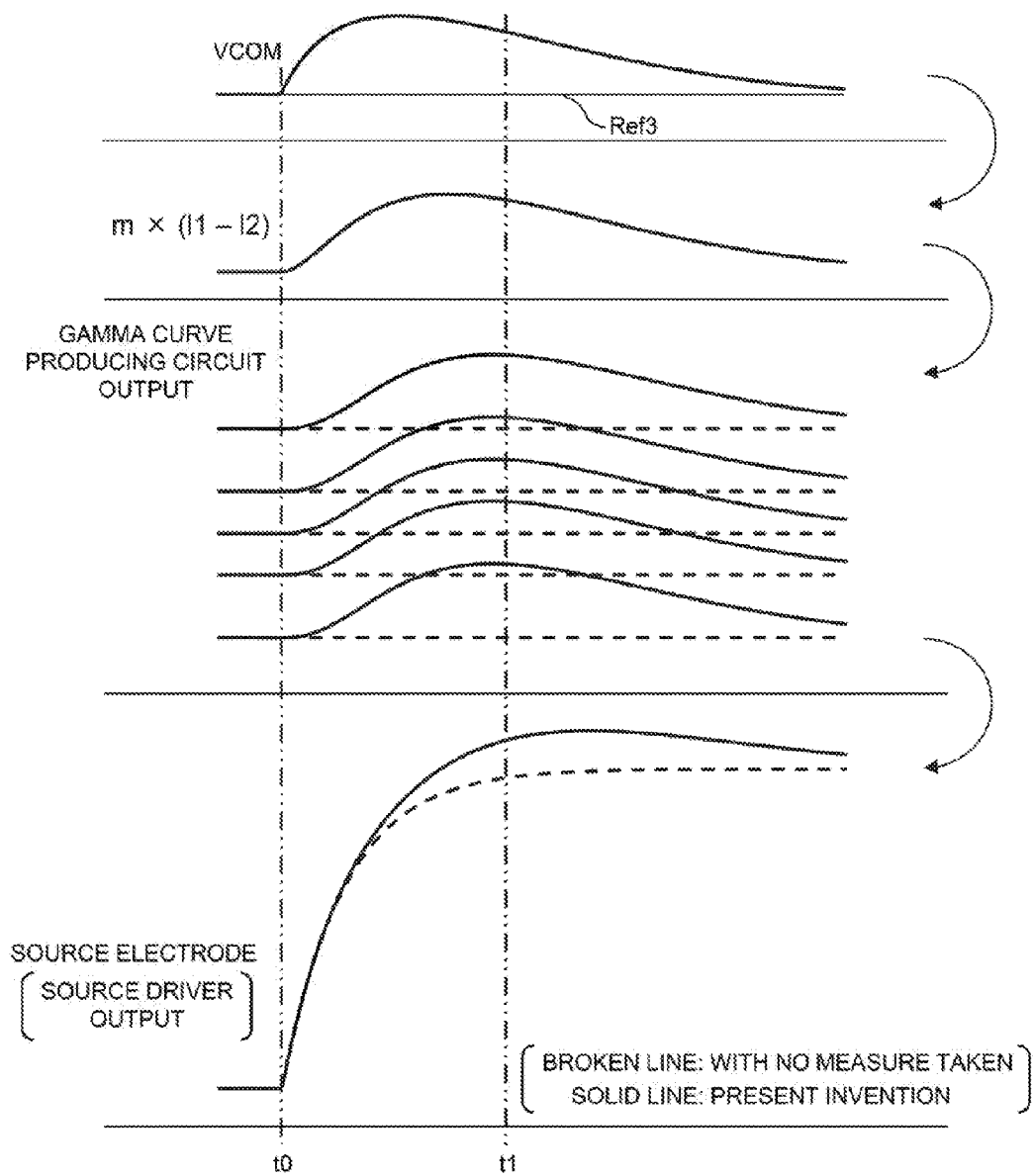

US 9,983,454 B2

DRIVING APPARATUS, DISPLAY DRIVER AND ELECTRONIC APPARATUS

CROSS-REFERENCE TO RELATED APPLICATIONS

The Present application claims priority from Japanese application JP 2015-084764 filed on Apr. 17, 2015, the content of which is hereby incorporated by reference into this application.

BACKGROUND

The present invention relates to a technique for drive control of a driven element which receives a common voltage through a common terminal and a drive signal through a data terminal, e.g. a technique useful for a display driver operable to drive a display panel.

The driven elements are each arranged to receive a common voltage through a common terminal and a drive signal through a data terminal. One example of a driven element is a liquid crystal display element. To drive a display panel having liquid crystal display elements arranged in a matrix, a display driver is used. The display driver can produce a plurality of gradation voltages, select liquid crystal display elements of a display line in each horizontal display period, and provide data terminals of the selected display elements with gradation voltages according to display data. In the display driver, a predetermined common voltage is applied to the common terminal of the liquid crystal display elements. Pieces of electric charge information depending on potential differences of gradation voltages with respect to the common voltage are held by the liquid crystal display elements. Moreover, a shutter state depending on electric charge information held is created in each the relevant liquid crystal display elements.

Such a display driver is described in e.g. the Japanese Unexamined Patent Application Publication No. 2011-209489.

SUMMARY

One embodiment described herein is a driving device used for drive control of a driven device having a plurality of driven elements arranged to commonly receive a common voltage at common terminals and individually receive drive signals at data terminals. The driving device includes a drive voltage-producing circuit configured to produce a plurality of drive voltages and a driver circuit configured to accept input of the drive voltages produced by the drive voltage-producing circuit, and output, as drive signals, signals selected from the drive voltages according to drive data from a plurality of data output terminals in parallel. The driving device includes a common voltage-producing circuit configured to produce a common voltage to output from a common-voltage-output terminal where the drive voltage-producing circuit is configured to detect a change in the common voltage output from the common-voltage-output terminal and change the drive voltages in the direction of the change.

Another embodiment described herein is a display driver to be used for display drive control of a display panel having a plurality of display elements arranged like a matrix, configured to receive a common voltage at common terminals and drive signals at data terminals. The display driver includes a gradation voltage-producing circuit configured to produce a plurality of gradation voltages and a driver circuit which configured to accept input of the plurality of gradation voltages produced by the gradation voltage-producing circuit and output, as drive signals, the gradation voltages selected according to display data from a plurality of data output terminals in parallel. The display driver includes a common voltage-producing circuit configured to produce a common voltage output from a common-voltage-output terminal where the gradation voltage-producing circuit is configured to detect a change in a common voltage output from the common-voltage-output terminal and vary the gradation voltages in the direction of the change.

Another embodiment described herein is an electronic apparatus that includes a driven device having a plurality of driven elements arranged to commonly receive a common voltage at common terminals and individually receive drive signals at data terminals and a driving device used for drive control of the driven device. The driving device includes a drive voltage-producing circuit configured to produce drive voltages having plurality of levels, a driver circuit configured to accept input of the plurality of drive voltages produced by the drive voltage-producing circuit, and output, as drive signals, drive voltages selected according to drive data in parallel from a plurality of data output terminals, and a common voltage-producing circuit configured to produce a common voltage to be output from a common-voltage-output terminal. Moreover, the drive voltage-producing circuit is configured to detect a change in a common voltage output from the common-voltage-output terminal, and change the drive voltages in a direction of the change.

BRIEF DESCRIPTION OF THE DRAWINGS

FIG. 11 is a waveform diagram showing, by example, an operation waveform in the circuit of FIG. 9.

DETAILED DESCRIPTION

Figure 1:
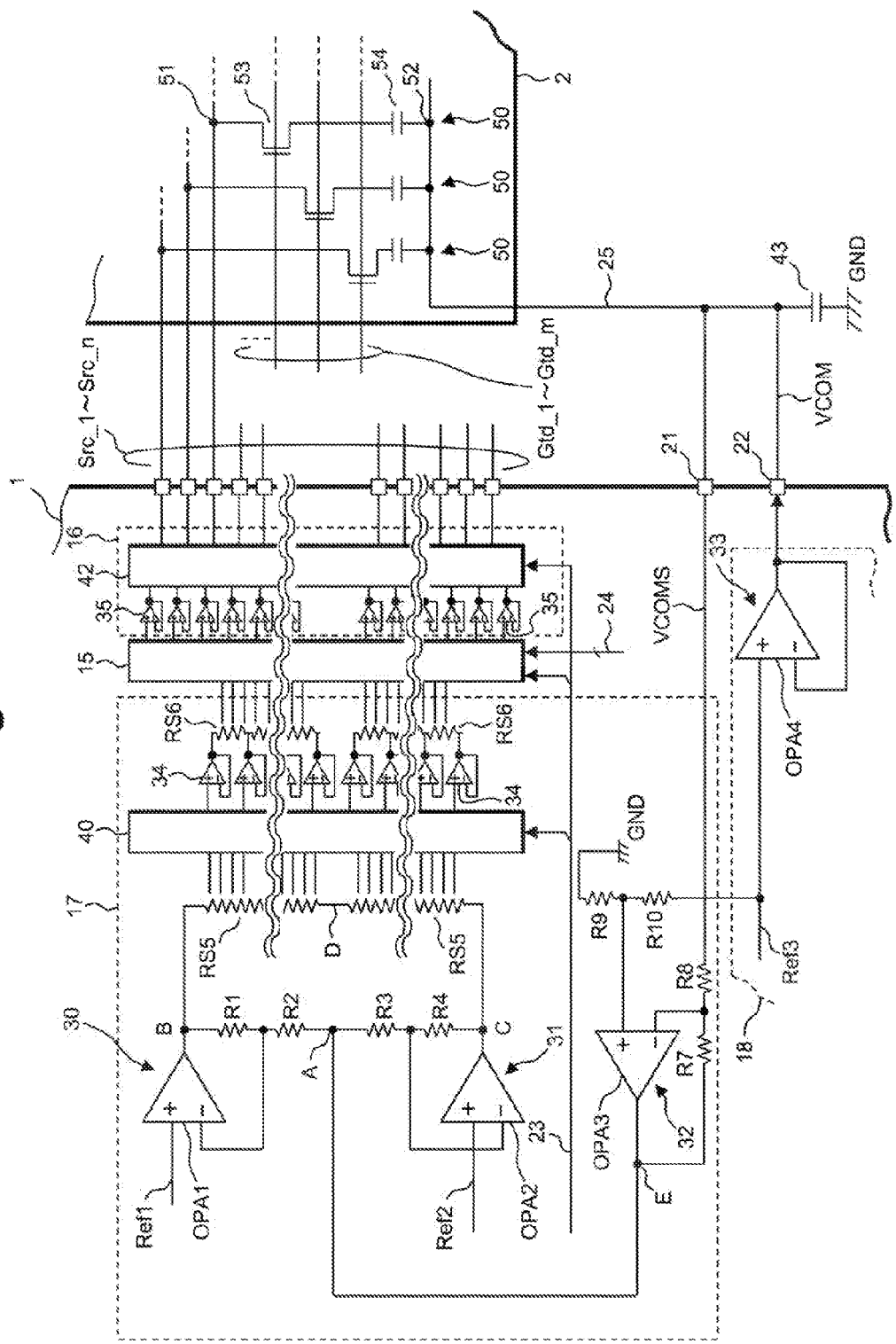
FIG. 1 is a circuit diagram showing a first specific embodiment of a gradation voltage-producing circuit and its surrounding.

As in the case of a liquid crystal display panels, a larger number of display elements increases the number of data lines accordingly. Supplying data lines with various gradation voltages causes the fluctuation of a common voltage of a common terminal making a counter electrode for data terminals of display elements and can require a substantial amount of time to converge the common voltage. This fluctuation introduces noise into the common voltage. The fluctuation of the common voltage because of this noise can become larger as the number of data lines increases. If the fluctuation of the common voltage is not converged with the selected display elements, an error can occur in an electric charge stored by each display element. Namely an electric charge held by each display element even if gradation voltages on data lines have converged. The error of this kind can be made manifest as a gradation level error, i.e. a display color error. Therefore, it is desired to converge the common voltage of the common terminals and gradation voltages of the data terminals before the display elements are deselected.

However, common terminals of many display elements are commonly connected on a display panel. So, a common driver circuit for supplying a common voltage to the display panel may use a large driving current. Such a common driver circuit drives wiring of with relatively large impedance, and as such, can have relatively poor responsiveness to a voltage drop at an output terminal. However, increasing the driving ability of the common driver circuit to allow its feedback to work effectively increases the power consumption and chip size, which may be a less desired solution.

One embodiment described herein provides a driving technique which mitigates the influence of the fluctuation of a common voltage supplied to common terminals of driven elements without increasing power consumption and chip size.

The above and other objects of the invention and novel features thereof will become apparent from the description hereof and the accompanying diagrams.

Of the embodiments herein disclosed, a representative embodiment will be briefly outlined below. Now, it is noted that reference characters etc. in parentheses described in each item are just examples for easier understanding.

[1] Changing a Drive Voltage in a Direction of Change of a Common Voltage

A driving device (1, 1_A, 1_B) according to the invention is used for drive control of a driven device (2) having a plurality of driven elements (50) arranged to commonly receive a common voltage (VCOM) at common terminals (52) and individually receive drive signals at data terminals (51). The driving device includes: a drive voltage-producing circuit (17, 17_A, 17_B) which produces drive voltages; a driver circuit (15, 16) which accepts input of the drive voltages produced by the drive voltage-producing circuit, and outputs, as drive signals, signals selected from the drive voltages according to drive data from data output terminals in parallel; and a common voltage-producing circuit which produces a common voltage to output from a common-voltage-output terminal (22). The drive voltage-producing circuit detects a change in the common voltage output from the common-voltage-output terminal, and changes the drive voltages in the direction of the change.

In this example, if a common voltage output to the outside from the common-voltage-output terminal is fluctuated, drive voltages are varied in the direction of change of the common voltage, whereby a voltage error applied between common and data terminals of each driven element can be corrected. Further, the load on the drive voltage-producing circuit due to the action of providing drive voltages to the driver circuit is smaller than the load on the common voltage-producing circuit due to the action of outputting the common voltage to the outside and therefore, the large increase in its circuit scale or power consumption is not required for improving the ability of to converge when changing drive voltages according to the fluctuation of the common voltage. The circuit scale and power consumption of a common voltage-producing circuit may be largely increased for direct enhancement of the convergence responsiveness of a common voltage according to the fluctuation of the common voltage. Therefore, the influence of the fluctuation of a common voltage supplied to the common terminal of each driven element can be mitigated or removed without increasing the power consumption or chip size.

[2] Changing Drive Voltages with Inverting Amplifiers

The driving device as described in the item 1 has a common-voltage-input terminal (21) for accepting input of the common voltage output from the common-voltage-output terminal from outside the driving device (1 in FIG. 1) and providing the common voltage to the drive voltage-producing circuit (17 in FIG. 1). The drive voltage-producing circuit includes a first non-inverting amplifier (30) arranged so that a division voltage of its output voltage relative to a reference node voltage (i.e. a voltage at a node A) is fed back thereto, and a second non-inverting amplifier (31) arranged so that a division voltage of its output voltage relative to the reference node voltage is fed back thereto, and produces a plurality of drive voltages by division of a voltage between the output voltage of the first non-inverting amplifier (30) and the output voltage of the second non-inverting amplifier (31). The drive voltage-producing circuit further includes an inverting amplifier (32) which forms a correction voltage depending on a difference between the input common voltage (VCOMS) input through the common-voltage-input terminal and a target voltage (Ref3) of the common voltage output from the common-voltage-output terminal, and provides the correction voltage to the reference node.

In this example, a correction voltage produced by the inverting amplifier is applied to a reference node for forming feedback voltages of the two non-inverting amplifiers, whereby the outputs of the two non-inverting amplifiers can be changed by the correction voltage. The two non-inverting amplifiers are used for a power source of the voltage-dividing circuit which forms drive voltages and allows drive voltages to follow the fluctuation of the common voltage. Thus, a voltage error applied between the common and data terminals of each driven element is corrected before convergence of the common voltage. The inverting amplifier is not required to have a particularly large driving ability. The inverting amplifier is adequate as long as it has the ability to change and converge the feedback voltages of the two non-inverting amplifiers.

[3] Embodiment of the Circuit Operable to Change Drive Voltages with Inverting Amplifier The driving device as described in the item 1 has a common-voltage-input terminal (21) for accepting input of a common voltage output from the common-voltage-output terminal from outside the driving device (1 in FIG. 1) and providing the common voltage to the drive voltage-producing circuit (17 in FIG. 1). In the driving device, the drive voltage-producing circuit includes a first non-inverting amplifier (30) which amplifies a first reference voltage (Ref1) in a non-inverting manner to output a first voltage, and whose feedback quantity is decided by a first voltage-dividing circuit (R1, R2) provided between a reference node (A) and an output terminal. The drive voltage-producing circuit also includes a second non-inverting amplifier (31) which amplifies a second reference voltage (Ref2) in a non-inverting manner to output a second voltage, and whose feedback quantity is decided by a second voltage-dividing circuit (R3, R4) provided between the reference node and an output terminal. A voltage-dividing circuit (RS5-RS5) forms, by division of a voltage between the first and second voltages, a plurality of division voltages to be used for producing drive voltages and an inverting amplifier (32) forms a correction voltage depending on a difference between an input common voltage (VCOMS) input from the common-voltage-input terminal and a target voltage (Ref3) of a common voltage output from the common-voltage-output terminal, provided that an output of the inverting amplifier is connected to the reference node.

The arrangement like this has the effect and advantages similar to those the arrangement described in item 2 provides.

Figure 7:
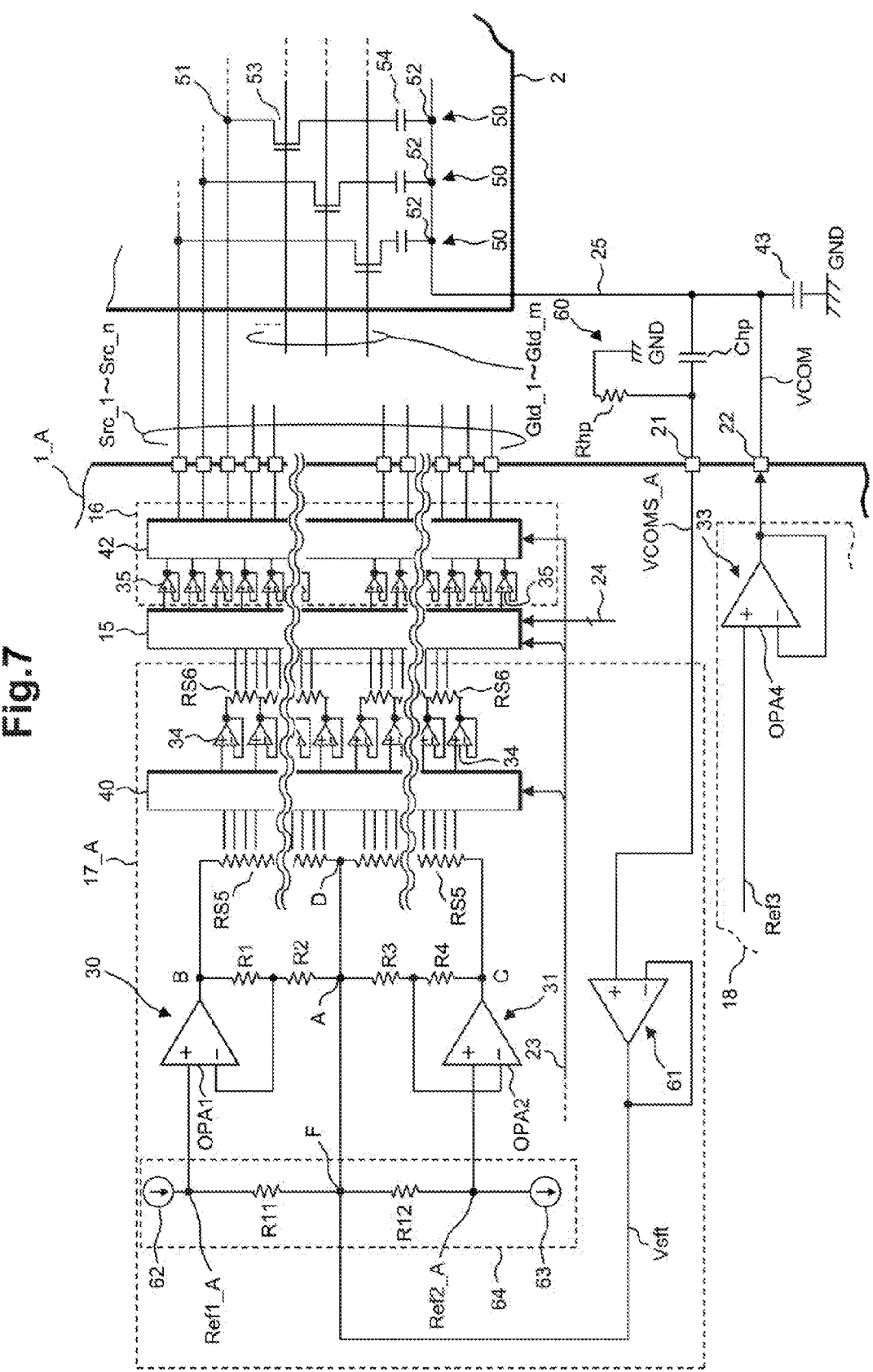
FIG. 7 is a circuit diagram showing a second specific example of the gradation voltage-producing circuit with its peripheral parts.

[4] Shifting a Voltage to be Used as a Reference for Producing Drive Voltages by Input of a Voltage Corresponding to a Fluctuation of the Common Voltage from the Outside The driving device as described in the item 1 has a voltage input terminal (21) for accepting input of a voltage corresponding to a fluctuation of a common voltage output from the common-voltage-output terminal from outside the driving device (1_A in FIG. 7) and providing the voltage to the drive voltage-producing circuit (17_A in FIG. 7). The drive voltage-producing circuit includes: a first non-inverting amplifier (30) arranged so that a division voltage of its output voltage relative to a reference node voltage (i.e. a voltage at a node A) is fed back thereto, and a second non-inverting amplifier (31) arranged so that a division voltage of its output voltage relative to the reference node voltage is fed back thereto, and produces a plurality of drive voltages by division of a voltage between the output voltage of the first non-inverting amplifier (30) and the output voltage of the second non-inverting amplifier (31). The drive voltage-producing circuit further includes a reference voltage-producing circuit (64) which produces a reference voltage (Ref1) of the first non-inverting amplifier at an upstream node of an upstream side resistance (R11) located upstream of an intermediate node (F) where a predetermined current is passed, and produces a reference voltage (Ref2) of the second non-inverting amplifier at a downstream node of a downstream side resistance (R12) located downstream of the intermediate node. The drive voltage-producing circuit includes an input amplifier (61) which produces a shift voltage (Vsft) depending on the voltage corresponding to a fluctuation input from the voltage input terminal. The shift voltage is applied to the intermediate node, thereby causing the respective reference voltages to reflect a voltage change at the intermediate node, and the shift voltage is applied to the reference node, thereby causing output voltages of the first and second non-inverting amplifiers to reflect a voltage change at the reference node.

In this example, a shift voltage corresponding to a fluctuation of a common voltage output from the common-voltage-output terminal to the outside is applied to the intermediate node, whereby reference voltages of the two non-inverting amplifiers are shifted by the shift voltage, the shift voltage is applied to the reference node, whereby output voltages of the two non-inverting amplifiers are shifted by the shift voltage. The two non-inverting amplifiers are used for a power source of the voltage-dividing circuit, which allows division voltages produced by the voltage-dividing circuit to follow the fluctuation of the common voltage. Thus, a voltage error applied between the common and data terminals of each driven element is corrected before convergence of the common voltage. The input amplifier is not required to have a particularly large driving ability. The input amplifier is adequate as long as it has can change and converge the voltages at the intermediate node and the reference node.

[5] Embodiment of the Circuit which Accepts Input of a Fluctuation of the Common Voltage from the Outside and Shifts a Voltage Used as a Reference for Producing Drive Voltages The driving device as described in the item 1 has a voltage input terminal (21) for accepting input of a voltage corresponding to a fluctuation of a common voltage (VCOM) output from the common-voltage-output terminal (22) from outside the driving device (1_A in FIG. 7) and providing the voltage to the drive voltage-producing circuit (17_A in FIG. 7). The drive voltage-producing circuit has a reference voltage-producing circuit (64) which produces a first reference voltage (Ref1) at an upstream node of an upstream side resistance (R11) located upstream of an intermediate node (F) where a predetermined current is passed, and produces a second reference voltage (Ref2) at a downstream node of a downstream side resistance (R12) located downstream of the intermediate node. A first non-inverting amplifier (30) amplifies the first reference voltage (Ref1) in a non-inverting manner to output a first voltage, and whose feedback quantity is decided by a first voltage-dividing circuit (R1, R2) provided between a reference node (A) and an output terminal. A second non-inverting amplifier (31) amplifies the second reference voltage (Ref2) in a non-inverting manner to output a second voltage, and whose feedback quantity is decided by a second voltage-dividing circuit (R3, R4) provided between the reference node (A) and an output terminal. A voltage-dividing circuit (RS5-RS5) forms, by division of a voltage between the first and second voltages, a plurality of division voltages to be used for producing drive voltages and an input amplifier (61) produces a shift voltage (Vsft) corresponding to a voltage of fluctuation input from the common-voltage-input terminal and provides the shift voltage to the intermediate node and the reference node.

The arrangement like this has the effect and advantage similar to those the arrangement described in the item 4 provides.

[6] Supplying a Shift Voltage to an Intermediate Node of the Voltage-Dividing Circuit In the driving device as described in the item 5, the input amplifier further provides the shift voltage to the intermediate node (D) of the voltage-dividing circuits.

This arrangement can contribute to the enhancement of the convergence of division voltages produced by the voltage-dividing circuit formed in the event of the change in the shift voltage.

Figure 9:
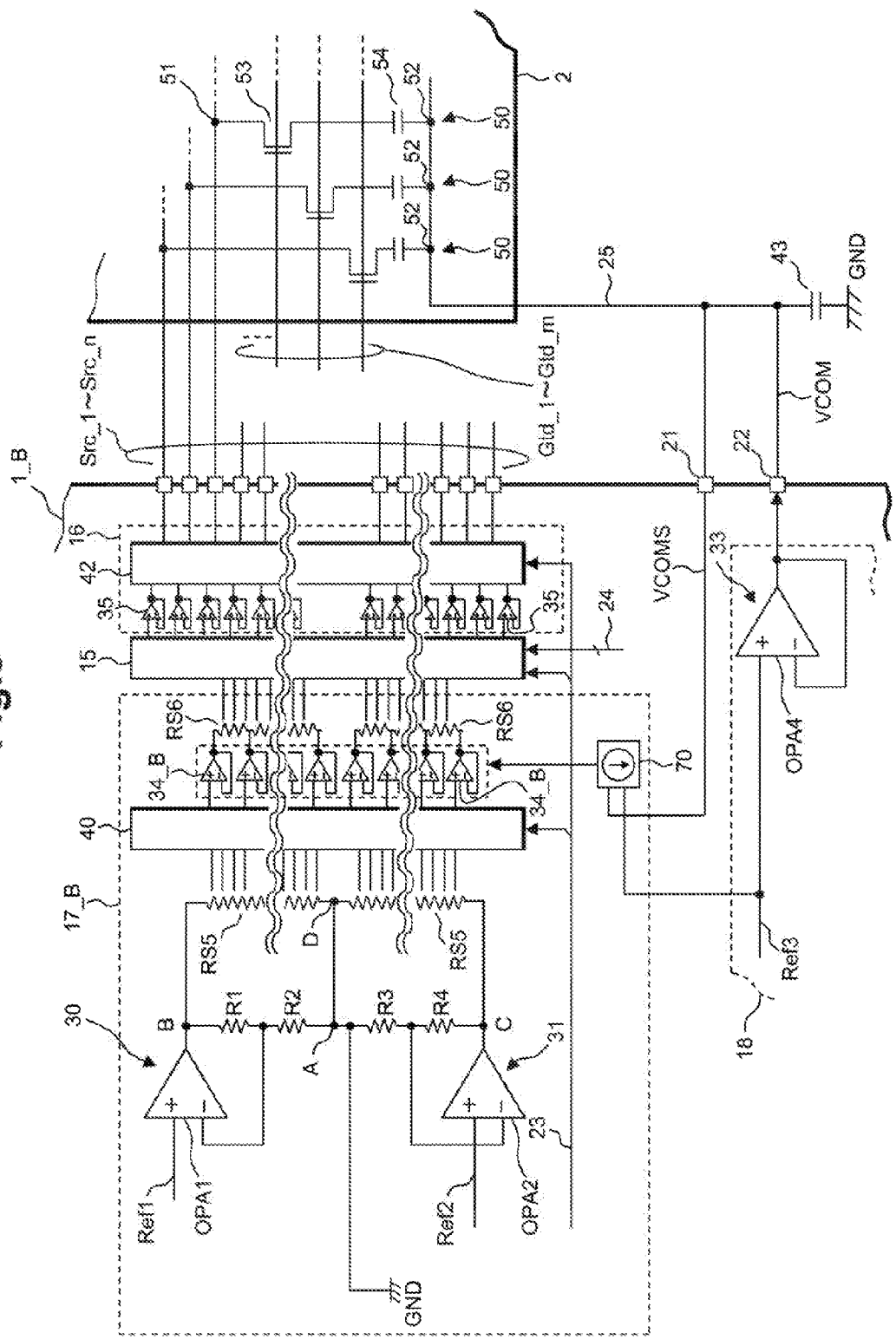
FIG. 9 is a circuit diagram showing the third specific example of the gradation voltage-producing circuit with its peripheral parts.

[7] Convert a Change in Common Voltage into Current to Allow Buffer Amplifiers to have an Offset The driving device as described in the item 1 has a common-voltage-input terminal (21) for accepting input of a common voltage output from the common-voltage-output terminal from outside the driving device (1_B in FIG. 9), and providing the common voltage to the drive voltage-producing circuit (17_B in FIG. 9). In the driving device, the drive voltage-producing circuit has a voltage-to-current conversion circuit (70) which converts a difference voltage between an input common voltage (VCOM) input from the common-voltage-input terminal, and a target voltage (Ref3) of a common voltage output from the common-voltage-output terminal into current; and a plurality of buffer amplifiers (34_B) on which an offset voltage formed by passing a current resulting from conversion by the voltage-to-current conversion circuit therethrough is used. The drive voltage-producing circuit produces, based on outputs of the buffer amplifiers, drive voltages reflecting a difference voltage between the input common voltage and a target voltage of the common voltage.

In this embodiment, an offset voltage on buffer amplifiers is generated by passing a current resulting from voltage-to-current conversion of a difference voltage between an input common voltage and a target voltage of a common voltage. As such, the buffer amplifiers do need a large driving ability. The offsets of the buffer amplifiers are arranged to follow a difference voltage between an input common voltage and a target voltage of a common voltage. Therefore, a voltage error applied between the common and data terminals of each driven element can be corrected.

[8] Embodiment of a Circuit which Converts a Change of a Common Voltage into Current, Thereby Arranging Each Buffer Amplifier Having an Offset The driving device as described in the item 1 has a common-voltage-input terminal (21) for accepting input of a common voltage output from the common-voltage-output terminal from outside the driving device (1_B in FIG. 9) and providing the common voltage to the drive voltage-producing circuit (17_B in FIG. 9). The drive voltage-producing circuit has a voltage-to-current conversion circuit (70) which converts a difference voltage between an input common voltage (VCOM) input from the common-voltage-input terminal and a target voltage (Ref3) of a common voltage output from the common-voltage-output terminal into current. A voltage-dividing circuit (RS5-RS5) produces a plurality of division voltages and a correction circuit (40, 34_B, RS6) corrects voltage curves according to division voltages produced by the voltage-dividing circuit to produce the drive voltages. The correction circuit has a plurality of buffer amplifiers (34_B) which receive the division voltages. The buffer amplifiers each have a feedback route (i.e. a route with a resistance Rfb) arranged to form an offset voltage with a current produced by the voltage-to-current conversion circuit passed therethrough.

The arrangement like this has the effect and advantage similar to those the arrangement described in the item 7 provides.

[9] Changing Gradation Voltages in the Direction of Change of the Common Voltage A display driver (1, 1_A, 1_B) according to the invention is used for display drive control of a display panel having a plurality of display elements arranged like a matrix, which receive a common voltage at common terminals and drive signals at data terminals. The display driver includes a gradation voltage-producing circuit which produces gradation voltages and a driver circuit which accepts input of gradation voltages produced by the gradation voltage-producing circuit and outputs, as drive signals, the gradation voltages selected according to display data from data output terminals in parallel. The display driver also includes a common voltage-producing circuit which produces a common voltage output from a common-voltage-output terminal. The gradation voltage-producing circuit detects a change in a common voltage output from the common-voltage-output terminal and varies the gradation voltages in the direction of the change.

In this arrangement, even if there is a fluctuation in a common voltage output from the common-voltage-output terminal to the outside, a voltage error applied between common and data terminals of each display element can be corrected by varying the gradation voltages in the direction of the change in the common voltage. Further, the load on the gradation voltage-producing circuit owing to the action of providing gradation voltages to the driver circuit is smaller than the load on the common voltage-producing circuit owing to output of a common voltage to the outside and therefore, the large increase in its circuit scale or power consumption is not required for enhancement of the convergence when changing gradation voltages according to the fluctuation of the common voltage. The circuit scale and power consumption of a common voltage-producing circuit must be largely increased for direct enhancement of the convergence responsiveness of a common voltage according to the fluctuation of the common voltage. Therefore, the influence of the fluctuation of a common voltage supplied to the common terminal of each display element can be eliminated without increasing the power consumption or chip size.

[10] Changing Gradation Voltages with Inverting Amplifiers

The display driver as described in the item 9 has a common-voltage-input terminal for accepting input of a common voltage output from the common-voltage-output terminal from outside the display driver (1 in FIG. 1) and providing the common voltage to the gradation voltage-producing circuit (17 in FIG. 1). The gradation voltage-producing circuit includes a first non-inverting amplifier arranged so that a division voltage of its output voltage relative to a reference node voltage is fed back thereto and a second non-inverting amplifier arranged so that a division voltage of its output voltage relative to the reference node voltage is fed back thereto, and produces the plurality of gradation voltages by division of a voltage between the output voltage of the first non-inverting amplifier and the output voltage of the second non-inverting amplifier. Further, the gradation voltage-producing circuit further includes an inverting amplifier which forms a correction voltage depending on a difference between an input common voltage input from the common-voltage-input terminal and a target voltage of the common voltage output from the common-voltage-output terminal, and provides the correction voltage to the reference node.

In this embodiment, even if there is a fluctuation in a common voltage produced by the gradation voltage-producing circuit owing to its driving load, a voltage difference applied between common and data terminals of each display element can be kept constant by changing gradation voltages by the fluctuation. Conventionally, even if the convergence by a source driver circuit is adequate, the voltage is allowed to be varied just up to a fixed gradation voltage and in the event of fluctuation of a common voltage, a common voltage-producing circuit can additionally be enhanced in its driving ability. However, according to the above means, a voltage difference applied between common and data terminals can be kept constant by changing gradation voltages and a convergence point of a source driver even in the event of fluctuation in a common voltage. The gradation voltage-producing circuit is smaller than the common voltage-producing circuit in load. Therefore, the influence of common voltage fluctuation can be eliminated with a lower power consumption in comparison to a power consumption in the case of enhancing the driving ability of the common voltage-producing circuit without involving large increase in circuit scale.

[11] Inputting a Voltage Corresponding to the Fluctuation in a Common Voltage from the Outside and Shifting a Voltage Making a Reference for Producing Drive Voltages The display driver as described in the item 9 further has a voltage input terminal for accepting input of a voltage corresponding to a fluctuation of a common voltage output from the common-voltage-output terminal from outside the display driver (1_A in FIG. 7) and providing the input voltage to the gradation voltage-producing circuit (17_A in FIG. 7). The gradation voltage-producing circuit includes a first non-inverting amplifier arranged so that a division voltage of its output voltage relative to a reference node voltage is fed back thereto and a second non-inverting amplifier arranged so that a division voltage of its output voltage relative to the reference node voltage is fed back thereto, and produces the plurality of gradation voltages by division of a voltage between the output voltage of the first non-inverting amplifier and the output voltage of the second non-inverting amplifier. The gradation voltage-producing circuit includes a reference voltage-producing circuit which produces a reference voltage of the first non-inverting amplifier at an upstream node of an upstream side resistance located upstream of an intermediate node where a predetermined current is passed, and produces a reference voltage of the second non-inverting amplifier at a downstream node of a downstream side resistance located downstream of the intermediate node. The gradation voltage-producing circuit also includes an input amplifier which produces a shift voltage corresponding to a change in a voltage of fluctuation input from the voltage input terminal. In the display driver, the shift voltage is applied to the intermediate node, thereby causing the respective reference voltages to reflect a voltage change at the intermediate node and the shift voltage is applied to the reference node, thereby causing output voltages of the first and second non-inverting amplifiers to reflect a voltage change at the reference node.

In this embodiment, a shift voltage corresponding to a fluctuation of a common voltage output from the common-voltage-output terminal to the outside is applied to the intermediate node, whereby the reference voltages of the two non-inverting amplifiers are shifted by the shift voltage, the shift voltage is applied to the reference node, whereby output voltages of the two non-inverting amplifiers are shifted by the shift voltage. The two non-inverting amplifiers are used for a power source of a voltage-dividing circuit and as such, division voltages produced by the voltage-dividing circuit are made to follow the fluctuation of a common voltage. Thus, a voltage error applied between common and data terminals of each display element is corrected before convergence of a common voltage. The input amplifier is not required to have a particularly large driving ability. The input amplifier is sufficient as long as it can change and converge the voltages at the intermediate node and the reference node.

[12] Converting a Common Voltage Change into Current to Make a Buffer Amplifier to have an Offset The display driver as described in the item 9 further has a common-voltage-input terminal for accepting input of a common voltage output from the common-voltage-output terminal from outside the display driver (1_B in FIG. 9) and providing the common voltage to the gradation voltage-producing circuit (17_B in FIG. 9). The gradation voltage-producing circuit has a voltage-to-current conversion circuit which converts a difference voltage between an input common voltage input from the common-voltage-input terminal, and a target voltage of a common voltage output from the common-voltage-output terminal into current and buffer amplifiers on which an offset voltage formed by passing therethrough a current resulting from conversion by the voltage-to-current conversion circuit is used. The gradation voltage-producing circuit produces, based on outputs of the buffer amplifiers, the plurality of drive voltages each reflecting a difference voltage between the input common voltage and the target voltage.

In this embodiment, an offset voltage on buffer amplifiers is formed by passing therethrough a current resulting from voltage-to-current conversion of a difference voltage between an input common voltage and a target voltage of a common voltage. Therefore, in order to decide an offset for the buffer amplifiers, it is adequate for the voltage-to-current conversion circuit to flow a current according to its element size ratio, and a particularly large driving ability is not required. The offset of the buffer amplifiers follows a difference voltage between an input common voltage and the target voltage and as such, a voltage error applied between common and data terminals of each display element can be corrected.

[13] Changing Drive Voltages in a Direction of Change of a Common Voltage

An electronic apparatus (5) according to the invention has driven device (2) having a plurality of driven elements arranged to commonly receive a common voltage at common terminals and individually receive drive signals at data terminals and a driving device (1, 1_A, 1_B) used for drive control of the driven device. The driving device has a drive voltage-producing circuit which produces a plurality of different levels of drive voltages, a driver circuit which accepts input of drive voltages produced by the drive voltage-producing circuit and outputs, as drive signals, drive voltages selected according to drive data in parallel from data output terminals, and a common voltage-producing circuit which produces a common voltage to be output from a common-voltage-output terminal. The drive voltage-producing circuit detects a change in a common voltage output from the common-voltage-output terminal, and changes the drive voltages in a direction of the change.

In this embodiment, the influence of the fluctuation of a common voltage supplied to a common terminal of each driven element can be eliminated without increasing the power consumption or chip size in the same way as in the embodiment described in the item 1.

[14] Changing Drive Voltages with Inverting Amplifiers

The electronic apparatus as described in the item 13, has a common-voltage-input terminal for accepting input of a common voltage output from the common-voltage-output terminal from outside the driving device (1 in FIG. 1) and providing the common voltage to the drive voltage-producing circuit (17 in FIG. 1). The drive voltage-producing circuit includes a first non-inverting amplifier arranged so that a division voltage of its output voltage relative to a reference node voltage is fed back thereto and a second non-inverting amplifier arranged so that a division voltage of its output voltage relative to the reference node voltage is fed back thereto. The drive voltage-producing circuit produces the drive voltages having a plurality of levels by division of a voltage between the output voltage of the first non-inverting amplifier and the output voltage of the second non-inverting amplifier. The drive voltage-producing circuit further includes an inverting amplifier which forms a correction voltage corresponding to a difference between an input common voltage input from the common-voltage-input terminal, and a target voltage of a common voltage output from the common-voltage-output terminal, and the correction voltage is provided to the reference node.

In this embodiment, outputs of the two non-inverting amplifiers can be changed by a correction voltage produced by the inverting amplifier, as in the same way as in the embodiment described in the item 2. Therefore, drive voltages can be arranged to follow the fluctuation of a common voltage. A voltage error applied between the common and data terminals of each driven element can be corrected even before convergence of a common voltage. The inverting amplifier is not required to have a particularly large driving ability. The inverting amplifier is sufficient so long as it can change and converge the feedback voltages of the two non-inverting amplifiers.

[15] Shifting the Voltage Used as a Reference for Producing Drive Voltages by Input of a Voltage Corresponding to a Fluctuation in a Common Voltage from the Outside The electronic apparatus as described in the item 13 has a voltage input terminal for accepting input of a voltage corresponding to a fluctuation of a common voltage output from the common-voltage-output terminal from outside the driving device (1_A in FIG. 7), and providing the voltage to the drive voltage-producing circuit (17_A in FIG. 7). The drive voltage-producing circuit includes a first non-inverting amplifier arranged so that a division voltage of its output voltage relative to a reference node voltage is fed back thereto and a second non-inverting amplifier arranged so that a division voltage of its output voltage relative to the reference node voltage is fed back thereto. The drive voltage-producing circuit produces a plurality of gradation voltages by division of a voltage between the output voltage of the first non-inverting amplifier and the output voltage of the second non-inverting amplifier. The drive voltage-producing circuit further includes a reference voltage-producing circuit which produces a reference voltage of the first non-inverting amplifier at an upstream node of an upstream side resistance located upstream of an intermediate node where a predetermined current is passed, and produces a reference voltage of the second non-inverting amplifier at a downstream node of a downstream side resistance downstream of the intermediate node and an input amplifier which produces a shift voltage depending on a change of a voltage of the fluctuation input from the voltage input terminal. The shift voltage is applied to the intermediate node, thereby causing the reference voltages to reflect a voltage change at the intermediate node, and the shift voltage is applied to the reference node, thereby causing output voltages of the first and second non-inverting amplifiers to reflect a voltage change at the reference node.

In this embodiment, a shift voltage corresponding to a fluctuation of a common voltage is applied to the intermediate node, whereby reference voltages of the two non-inverting amplifiers are shifted by the shift voltage, and the shift voltage is applied to the reference node, whereby output voltages of the two non-inverting amplifiers are shifted by the shift voltage. Further, division voltages produced by the voltage-dividing circuit can be arranged to follow the fluctuation of a common voltage, and a voltage error applied between the common and data terminals of each driven element can be corrected even before convergence of a common voltage. The above are the same as those achieved in the embodiment described in the item 4. The input amplifier is not required to have a particularly large driving ability. The input amplifier is sufficient so long as it can change and converge the voltages at the intermediate node and the reference node.

[16] Making a Buffer Amplifier have an Offset by Converting a Change in a Common Voltage into Current The electronic apparatus as described in the item 13 has a common-voltage-input terminal for accepting input of a common voltage output from the common-voltage-output terminal from outside the driving device (1_B in FIG. 9) and providing the common voltage to the drive voltage-producing circuit (17_B in FIG. 9). The drive voltage-producing circuit has a voltage-to-current conversion circuit which converts a difference voltage between an input common voltage input from the common-voltage-input terminal, and a target voltage of a common voltage output from the common-voltage-output terminal into current and a plurality of buffer amplifiers on which an offset voltage formed by passing therethrough a current resulting from conversion by the voltage-to-current conversion circuit is used. The drive voltage-producing circuit produces, based on outputs of the buffer amplifiers, drive voltages reflecting a difference voltage between the input common voltage and the target voltage.

In this embodiment, an offset voltage of a buffer amplifier is formed by passing therethrough a current resulting from the voltage-to-current conversion of a common voltage difference in the same way as in the embodiment described in the item 7. Therefore, it is adequate for the voltage-to-current conversion circuit to flow a current according to its element size ratio, in order to decide an offset for each buffer amplifier. So, a particularly large driving ability is not required. The offset of each buffer amplifier follows a difference voltage between an input common voltage and the target voltage and as such, a voltage error applied between common and data terminals of each driven element can be corrected.

The effect achieved by the representative embodiment of the embodiments herein disclosed will be briefly described below.

The influence of the fluctuation of a common voltage supplied to a common terminal of each driven element can be eliminated without increasing the power consumption or chip size.

Figure 2:
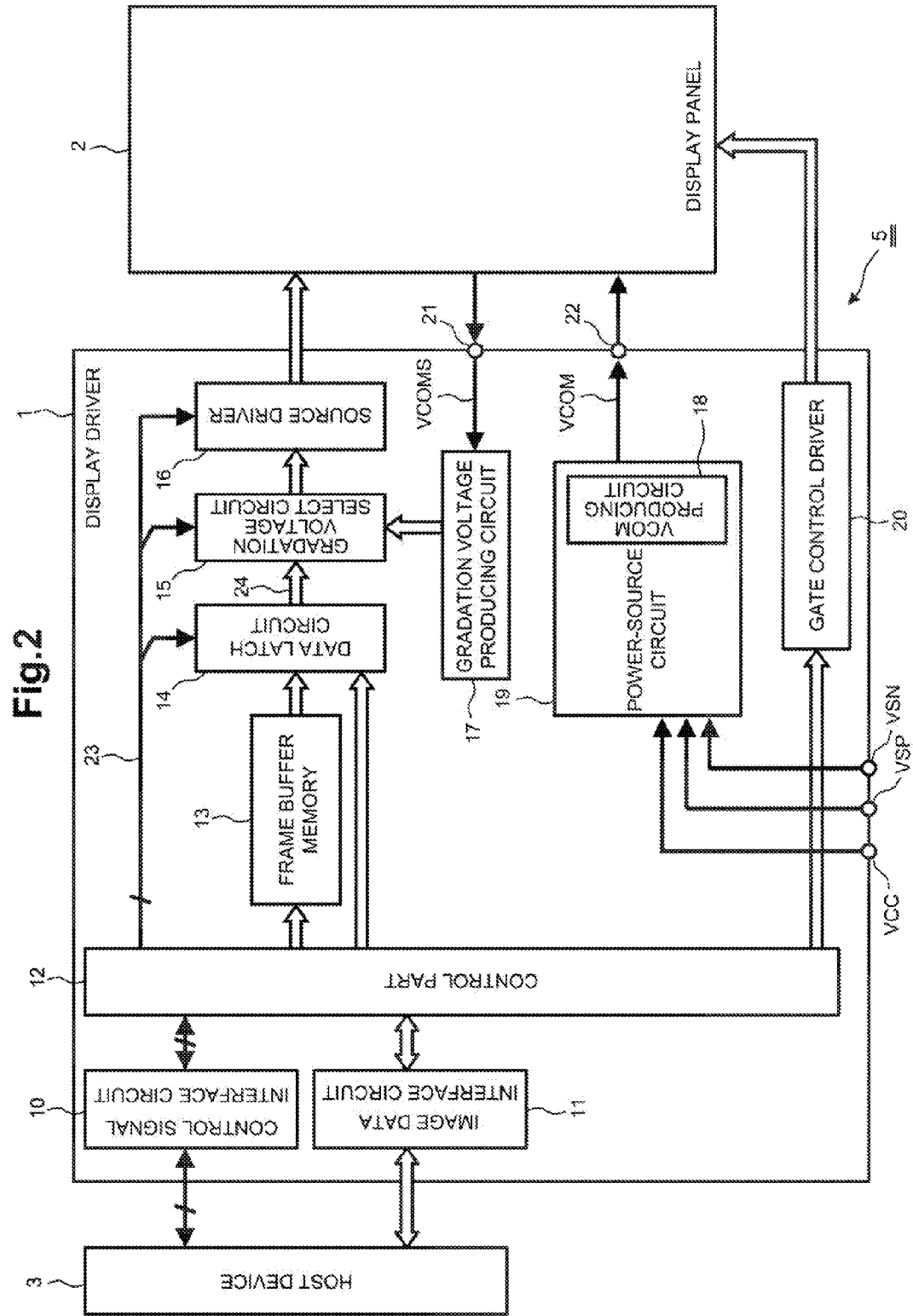
FIG. 2 is a block diagram showing an example of an electronic apparatus.

FIG. 2 shows an example of an electronic apparatus. Here, a display module having e.g. a display panel 2 as the driven device, and a display driver 1 in charge of display drive control of the display panel. The display module is applied to a mobile terminal, a personal computer display or the like and display data and control commands are supplied from a host device 3. In application to e.g. a mobile terminal, the host device 3 includes e.g. a communication unit which can be connected to a mobile communication network or the like, a protocol processor which performs a communication protocol process by use of the communication unit, an application processor which performs various kind of data process controls in addition to control of the protocol processor, and other peripheral devices including an auxiliary storage and an external interface circuit. The structure of the host device 3 is not limited to this. It may be changed or modified according to a function to be realized by the electronic apparatus 5.

Figure 3:
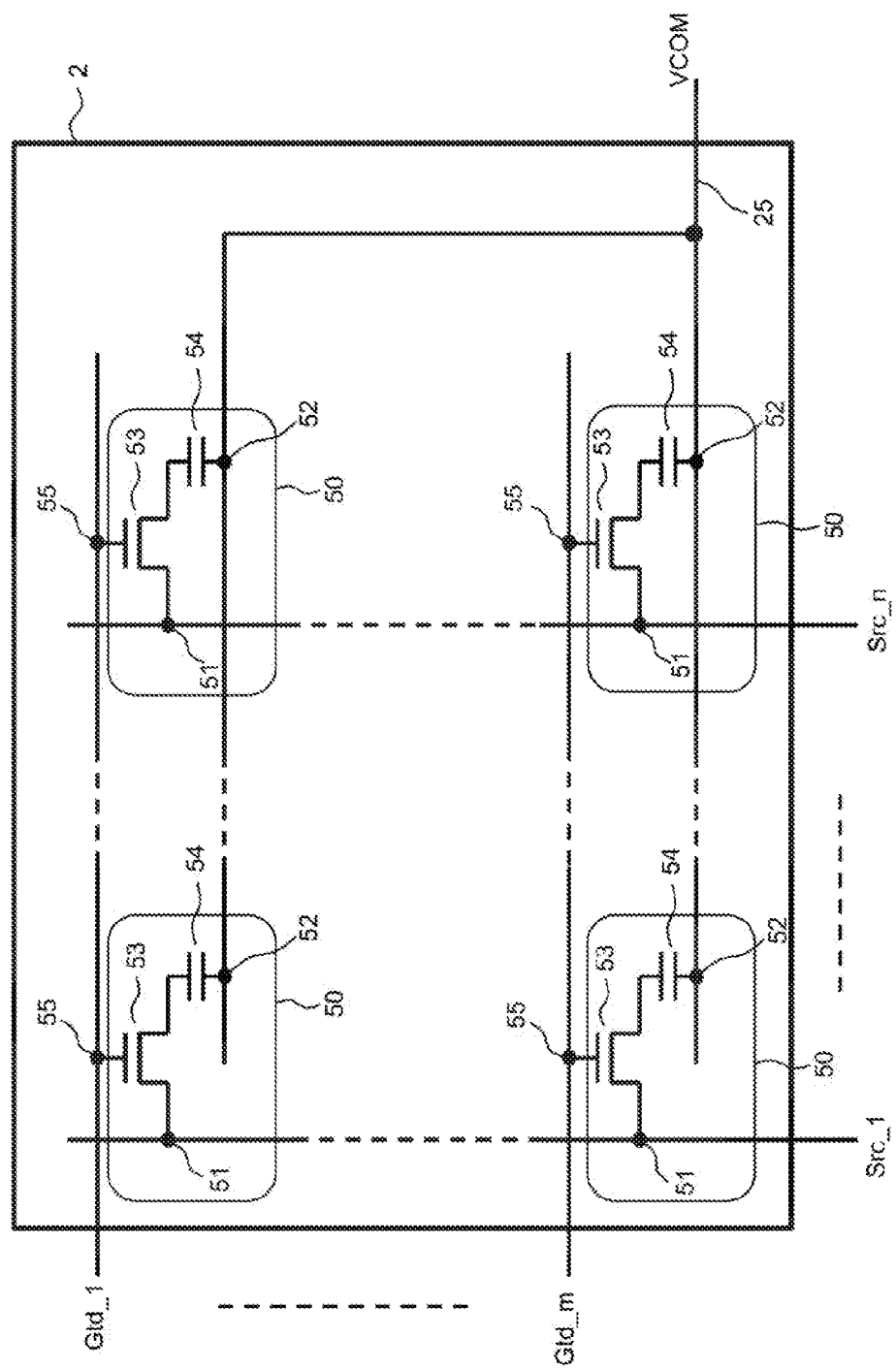
FIG. 3 is a circuit diagram showing a display element array of a liquid crystal display panel as a display panel.

Although no special restriction is intended, a liquid crystal display panel is used as the display panel 2 in the embodiment shown in FIG. 2. The display panel 2 has a glass substrate, and a plurality of display elements 50 formed on the glass substrate like a matrix as shown in FIG. 3 by example; each display element 50 has a data terminal 51 and a common terminal 52. Each display element 50 has a thin-film transistor 53 connected in series and a liquid crystal 54 sandwiched between a pair of liquid crystal electrodes. The data terminal 51 is coupled to the source of the thin-film transistor 53 while the common terminal 52 is coupled to one of the liquid crystal electrodes. While not shown in the diagram, the pair of liquid crystal electrodes may form another holding capacitance. The select terminal 55 of each display element 50 is coupled to the gate of the thin-film transistor 53. The display element 50 is supplied with a common voltage VCOM as a common potential through its common terminal 52. The select terminals 55 of the display elements 50 are connected to corresponding gate electrodes Gtd_1 to Gtd_m. The data terminals of the display elements 50 are connected to corresponding source electrodes Src_1 to Src_n arrayed along a direction in which they intersect with the gate electrodes Gtd_1 to Gtd_m. The individual lines of the display elements 50, corresponding to the gate electrodes Gtd_1 to Gtd_m form display lines. The thin-film transistors 53 of the display elements 50 are turned on for each display line, and the display lines are selected in this way (the display lines are scanned). In each select period (horizontal display period) of the display lines, the display element 50 is provided with drive signals according to display data through the source electrodes Src_1 to Src_n. In this embodiment, the respective drive signals are voltage signals selected from a plurality of gradation voltages according to display data. Turning off the thin-film transistor 53, the signal charge of a drive signal applied to each display element 50 is held by the capacitance formed between liquid crystal electrodes of the corresponding liquid crystal 54, and until the display line is selected next, the shutter state of the liquid crystal 54 is retained.

As shown in FIG. 2, the display driver 1 has e.g. an image data interface circuit 11 to which display data from a host device 2 are input, a control signal interface circuit 10 which control data and commands are input to/output from, a control part 12 which processes display data and control data supplied to the interface circuits 10 and 11, a frame buffer memory 13 in which display data are stored in display frames under the control of the control part 12, a data latch circuit 14 which latches display data under the control of the control part 12, a gradation voltage select circuit 15, a source driver 16, a gradation voltage-producing circuit 17, a VCOM producing circuit 18, a power supply circuit 19, and a gate-control driver 20. Although no special restriction is intended, the power supply circuit 19 accepts input of an external source voltage VCC for a logic operation, and external source voltages VSP and VSN for driving and then, produces an internal source voltage for logic, an internal source voltage for driving, and a reference voltage, and supplies them to respective parts. The data latch circuit 14 latches display data supplied from the outside in synchronization with a display timing, or display data read out from the frame buffer memory 13 in synchronization with a display timing in display lines. The gradation voltage select circuit 15 selects gradation voltages in pixels based on display data 24 latched by the data latch circuit 14. The gradation voltage-producing circuit 17 produces a plurality of gradation voltages and supplies them to the gradation voltage select circuit 15. The source driver 16 outputs, as drive signals, gradation voltages selected by the gradation voltage select circuit 15 from a plurality of data output terminals to the source electrodes Src_1 to Src_n in parallel. The gradation voltage select circuit 15 and the source driver 16 make an example of a driver circuit which accepts input of gradation voltages produced by the plurality of gradation voltage-producing circuit 17, and outputs, as drive signals, gradation voltages selected according to display data from the data output terminals in parallel. The VCOM producing circuit 18 produces a common voltage VCOM to output through a common-voltage-output terminal 22. The gate-control driver 20 sequentially performs switching to one of the gate electrodes Gtd_1 to Gtd_m and outputs agate select signal thereto in each horizontal display period.

AS shown in FIG. 2, by example, the display driver 1 has a common-voltage-input terminal 21 for accepting input of the common voltage VCOM output from the common-voltage-output terminal 22 from the outside of the display driver 1, and providing it to the gradation voltage-producing circuit 17. The common voltage input through the common-voltage-input terminal 21 is referred to as "input common voltage VCOMS", but it is simply referred to as "common voltage VCOM" in case that it does not particularly need distinguishing from the common voltage VCOM. As described based on the embodiment shown in FIG. 3, a predetermined common voltage VCOM is applied to the common terminals 52 of the liquid crystal display elements 50. When drive signals are provided to the source electrodes Src_1 to Src_n for each display line, the liquid crystal display elements 50 of the relevant display line are subjected to the overwrite of electric charge information according to the potential differences of gradation voltages relative to the common voltage VCOM. In this time, the load of one line of drive signals corresponds to the load on one line of source electrodes, whereas as to the common voltage VCOM, the load comes from the common voltage line 25 connected to all the liquid crystal display elements 50 of the display panel 2. Therefore, in case that the respective source electrodes Src_1 to Src_n are provided with various gradation voltages in display lines, the common voltage VCOM on a common terminal 52 making a counter electrode to the data terminal 51 of each liquid crystal display element fluctuates. The convergence of the fluctuation takes a longer time than the source electrodes.

Figure 4:
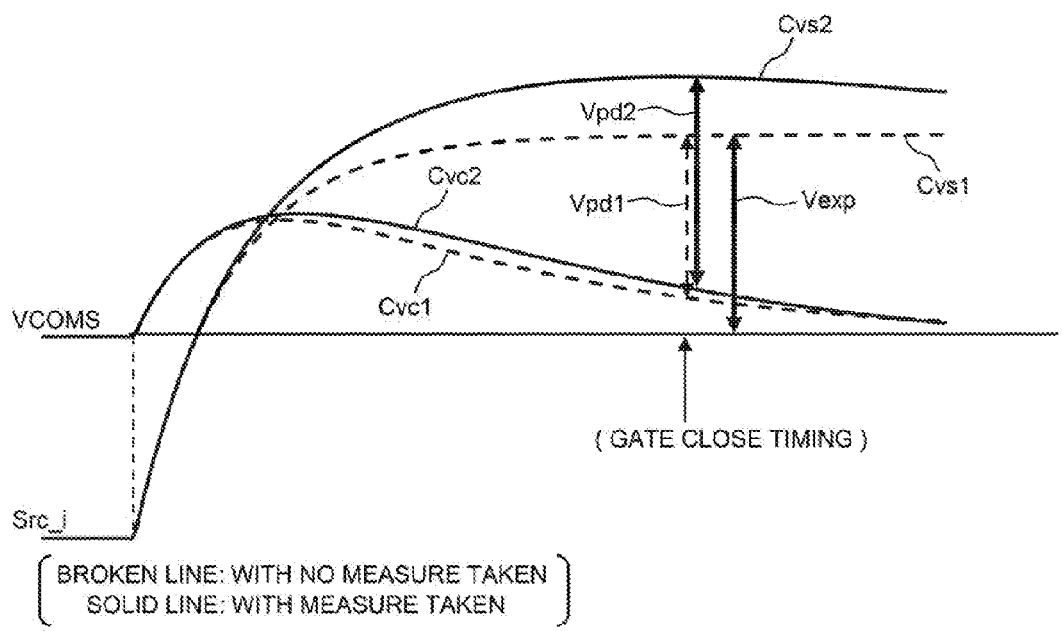
FIG. 4 is a waveform diagram for schematically showing, by means of voltage waveforms of one polarity, the principle of the solution of varying drive signal voltages in the direction of change in a common voltage in an embodiment arranged so that the voltages of drive signals are changed in the direction of change in the common voltage.

For instance, in case that driving the source electrode Src_i changes the common voltage VCOM as exemplified by the broken line Cvs1 in FIG. 4, the voltage on the source electrode Src_i converges in a relatively early timing, whereas the fluctuation of the common voltage VCOM does not converge in an early timing as shown by the broken line Cvc1. Incase that the gate of the thin-film transistor 53 is closed in the middle of the convergence, a potential difference Vpd1 in connection with capacitance electrodes of the liquid crystal produces an error with respect to an expected voltage Vexp. In case that the common voltage converges with a potential error arising between capacitance electrodes of the liquid crystal 54 owing to the fluctuation of the common voltage VCOM, the error is manifested as an error in gradation level, i.e. an error in display color.

Therefore, in the display driver 1, the gradation voltage-producing circuit 17 performs a circuit operation which includes detecting the change in the common voltage VCOM output from the common-voltage-output terminal 22 and then, changing gradation voltages in the direction of the change. For instance, as shown in FIG. 4, the fluctuation in the common voltage VCOM never converges in an early timing as shown by the solid line Cvc2 similar to the broken line Cvc1, whereas the gradation voltage-producing circuit 17 detects the change in the output common voltage VCOM by means of the input common voltage VCOMS, and changes the drive signal on the source electrode Src_i by a quantity corresponding to the change shown by the solid line Cvs2. Even if the gate of the thin-film transistor 53 is closed in the middle of the convergence, a potential difference Vpd2 between the capacitance electrodes of the liquid crystal 54 becomes substantially equal to an expected voltage Vexp. Then, even if the common voltage VCOM converges, the voltage is retained between the capacitance electrodes of the liquid crystal 54.

FIG. 1 shows a specific example of the gradation voltage-producing circuit 17. The gradation voltage-producing circuit 17 has a first non-inverting amplifier 30, a second non-inverting amplifier 31, an inverting amplifier 32, a plurality of resistance arrays RS5 connected in series, a selector circuit 40; buffer amplifiers 34, and resistance arrays RS6 connected in series.

The first non-inverting amplifier 30 has an operational amplifier OPA1 and resistances R1 and R2 connected in series between a reference node A and an output node B. The operational amplifier OPA1 has a non-inverting input terminal (+) to which a reference voltage Ref1 is input; an inverting input terminal (−) which is coupled to the connection node of the resistances R1 and R2 and an output terminal connected to the output node B. Likewise, the second non-inverting amplifier 31 has an operational amplifier OPA2 and resistances R3 and R4 connected in series between the reference node A and the output node C. The operational amplifier OPA2 has a non-inverting input terminal (+) to which a reference voltage Ref2 is input, an inverting input terminal (−) coupled to the connection node of the resistance elements R3 and the resistance R4, and an output terminal connected to the output node C. Although no special restriction is intended, the first non-inverting amplifier 30 outputs 5 V with a reference voltage Ref1 of 1.3 V, and the second non-inverting amplifier 31 outputs −5 V with a reference voltage Ref2 of −1.3 V.

The plurality of resistance arrays RS5 connected in series with the node D arranged therebetween have an upstream end connected to the output node B and a downstream end connected to the output node C, forming a resistance-type voltage-dividing circuit which produces division voltages at a predetermined voltage pitch.

Figure 5:
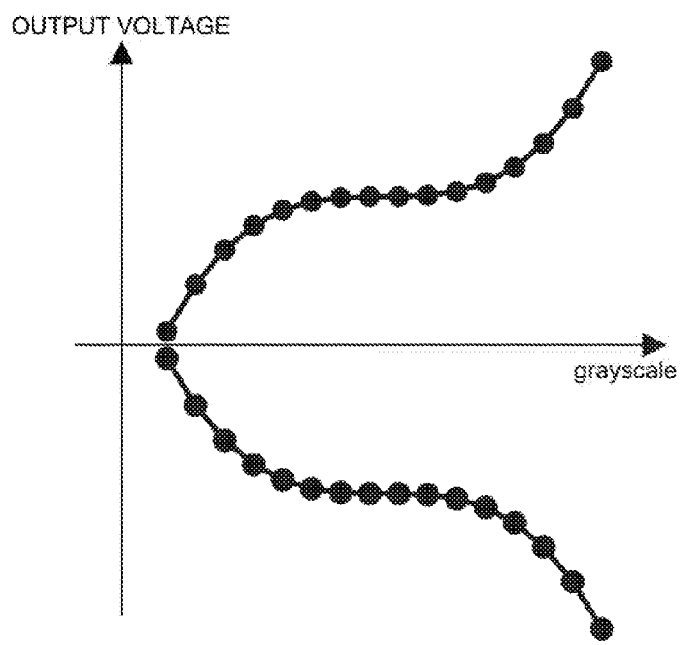
FIG. 5 is a waveform diagram showing an example of a gamma curve.

The selector 40 accepts input of division voltages resulting from the division by the plurality of resistance arrays RS5, and selects, from the input division voltages, a gamma curve voltage fitting a desired gamma curve at a predetermined gray scale pitch. The select control thereof is performed according to control signals from the control part 12. The gamma curve voltages correspond to voltages of filled circles in FIG. 5.

The plurality of buffer amplifiers 34 receive gamma curve voltages selected in the select circuit 40 and then output these voltages.

The plurality of resistance arrays RS6 connected in series are connected between outputs of adjacent buffer amplifiers 34 in turn. Each resistance array RS6 serves to divide the voltage between an output of the buffer amplifier 34 connected to its upstream end and an output of the buffer amplifier 34 connected to the downstream end. Thus, the plurality of resistance arrays RS6 connected in series output gradation voltages according to a gamma curve as exemplified by FIG. 5. The kind of such gradation voltages depends on the number of required gradations.

The gradation voltage select circuit 15 accepts input of gradation voltages subjected to gamma correction, and selects gradation voltages corresponding to the source electrodes Src_1 to Src_n according to display-line data 24 latched by the data latch circuit 14. The selected gradation voltages are sent to the selector 42 of the source driver 16 through buffer amplifiers 35. The selector 42 performs the polarity inversion control on outputs of the buffer amplifiers 35 based on control signals 23 and outputs drive signals to the corresponding source electrodes Src_1 to Src_n. Although no special restriction is intended, polarity inversion for each horizontal display period or each vertical display period is adopted for the polarity control on the outputs of the buffer amplifiers 35.

The VCOM producing circuit 18 has a buffer amplifier 33 including an operational amplifier OAP4 which receives a reference voltage Ref3 at its non-inverting input terminal (+) and accepts the feedback of its output at the inverting input terminal (−). In this embodiment, the reference voltage Ref3 is a target voltage of the common voltage VCOM. The buffer amplifier 33 outputs the common voltage VCOM from the output terminal 22 to the display panel 2. Current passed from the common-voltage-output terminal 22 is relatively large, in which a large voltage drop would be caused. Against this, a measure for stabilization of the common voltage VCOM is taken by disposing a stabilization capacitance 43 outside the common-voltage-output terminal 22. Although no special restriction is intended, the common voltage VCOM is −1 V.

The inverting amplifier 32 has an operational amplifier OAP3, resistances R7 and R8 connected in series between the common-voltage-input terminal 21 and the output node E, and resistances R9 and R10 connected in series between the reference voltage Ref3 and the ground GND. The operational amplifier OPA3 has a non-inverting input terminal (+) to which a connection node of the resistances R9 and R10 is coupled, an inverting input terminal (−) to which a connection node of the resistances R7 and R8 is coupled, and an output terminal is connected to the output node E. The inverting amplifier 32 forms a correction voltage according to the difference between the input common voltage VCOMS input through the common-voltage-input terminal 21, and the target voltage Ref3 of the common voltage VCOM output from the common-voltage-output terminal 22. The value of the correction voltage can be adjusted by the values of the resistances R7 to R9.

Figure 6:
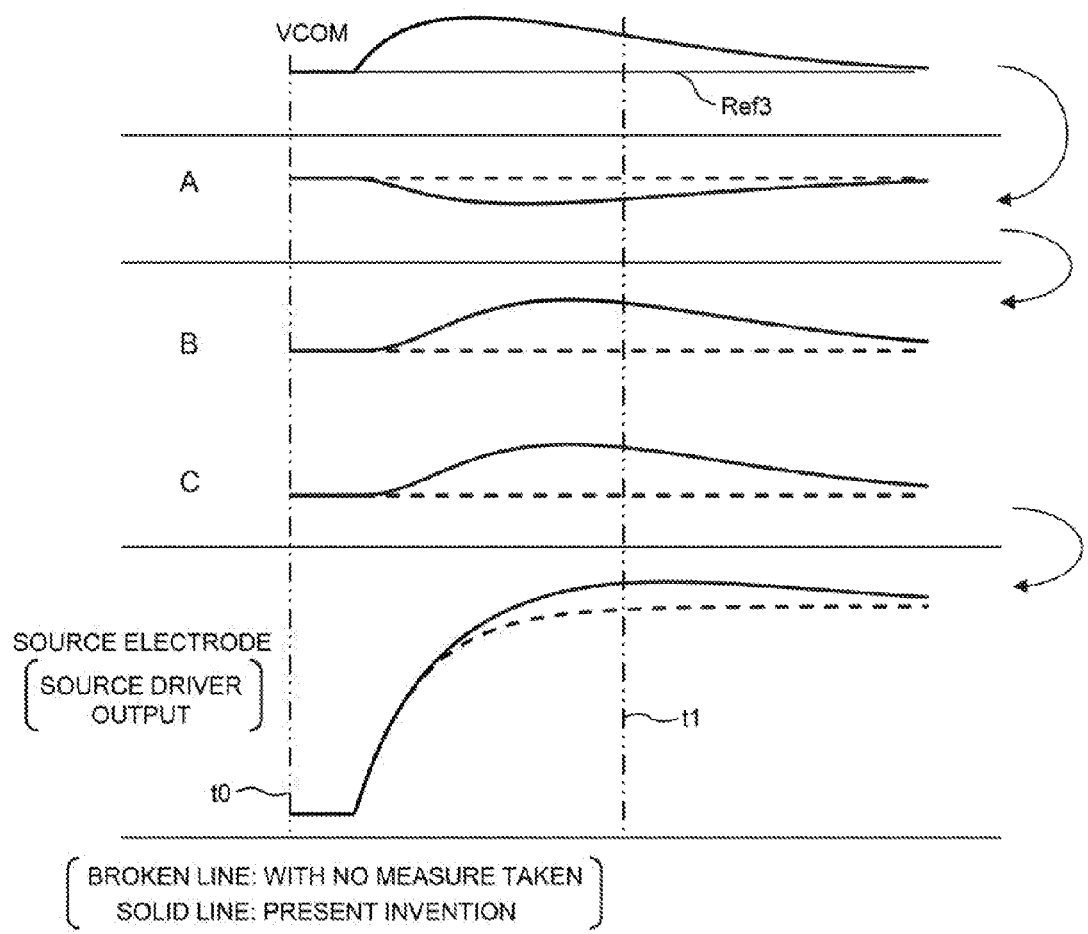
FIG. 6 is a waveform diagram showing, by example, an operation waveform in the circuit of FIG. 1.

The correction voltage is applied to the reference node A. On application of the correction voltage to the reference node A, the potentials of the nodes B and C are shifted to the same direction by the voltage applied. The voltage between the nodes B and C is used for the power source of the voltage-dividing circuit formed by the plurality of resistance arrays RS5 and therefore, the gradation voltages can be made to follow the fluctuation of the common voltage VCOM and consequently, the error of a voltage applied between the common terminal 52 and the data terminal 51 of each liquid crystal display element 50 before the convergence of the common voltage VCOM can be corrected. For instance, as shown in FIG. 6, at the time t0, a display line is selected and drive signals are supplied to the relevant source electrodes, whereby the source electrodes are driven and accordingly, the common voltage VCOM is fluctuated. At the time t1, the voltage of each source electrode has converged, but the common voltage VCOM larger than the drive signals in driving load has not converged yet. At this time, the potentials at the nodes A, B and C are changed following the change in the common voltage VCOM. The changes depend on a voltage difference between the target voltage Ref3 of the common voltage and the input common voltage VCOM and therefore, the potential difference between the data terminal 51 and the common terminal 52, i.e. the voltage between capacitance electrodes of the liquid crystal 54 has been corrected in error owing to the fluctuation of common voltage VCOM, and the liquid crystal 54 is allowed to hold proper electric charge information. The inverting amplifier 32 is not required to have a particularly large driving ability. The inverting amplifier is sufficient so long as it can change and converge the feedback voltages of the non-inverting amplifiers 30 and 31. Therefore, it is not required to increase the circuit scale and power consumption of the inverting amplifier for making gradation voltages follow the fluctuation of the common voltage VCOM. The circuit scale and power consumption of the common voltage-producing circuit are largely increased for direct enhancement of the convergence responsiveness of a direct common voltage according to the fluctuation of the common voltage VCOM. Therefore, the influence of the fluctuation of the common voltage VCOM supplied to the common terminal 52 of the liquid crystal display element 50 can be eliminated without increasing the power consumption or chip size.

FIG. 7 shows a second specific example of the gradation voltage-producing circuit with its peripheral parts. The embodiment of FIG. 7 is different from the embodiment of FIG. 1 in that the fluctuation of the common voltage VCOM is directly input to the display driver from the outside to arrange gradation voltages reflecting VCOM. A voltage corresponding to a fluctuation of the common voltage VCOM output to the outside is formed by e.g. a high-pass filter 60 including a capacitance Chp which receives the common voltage VBCOM and a resistance Rhp. The voltage (VCOMS_A) corresponding to the fluctuation formed by the high-pass filter 60 is input through the voltage input terminal 21.

The gradation voltage-producing circuit 17_A has an upstream side resistance R11 and a downstream side resistance R12 connected in series between constant current sources 62 and 63 for producing reference voltages Ref1 and Ref2 of the non-inverting amplifiers 30 and 31 and a reference voltage-producing circuit 64 for forming a reference voltage Ref1 at an upstream node of the upstream side resistance R11 and a reference voltage Ref2 at a downstream node of the downstream side resistance R12. Further, the gradation voltage-producing circuit 17_A has an input amplifier 61 of which the output is coupled to the intermediate node F, which is a coupling point of the upstream side resistance R11 and the downstream side resistance R12. The input amplifier 61 is arranged as a voltage follower amplifier including an operational amplifier OPA5 which has a non-inverting input terminal (+) connected to the voltage input terminal, and an output terminal feedback-connected to its inverting input terminal (−). The input amplifier 61 applies, to the intermediate node F, a shift voltage Vsft depending on a voltage corresponding to a fluctuation input through the voltage input terminal 21. Further, the intermediate node F is coupled with the reference node A to which the resistances R2 and R3 are coupled. In addition, the node D of a resistance-type voltage-dividing circuit formed by the resistance arrays RS5 in series is coupled with the reference node A. The configuration of other elements or components is the same as that of the embodiment shown in FIG. 1 and as such, the like circuit elements or components are identified by the same reference numerals, labels, etc. and the detailed descriptions thereof are skipped.

Figure 8:
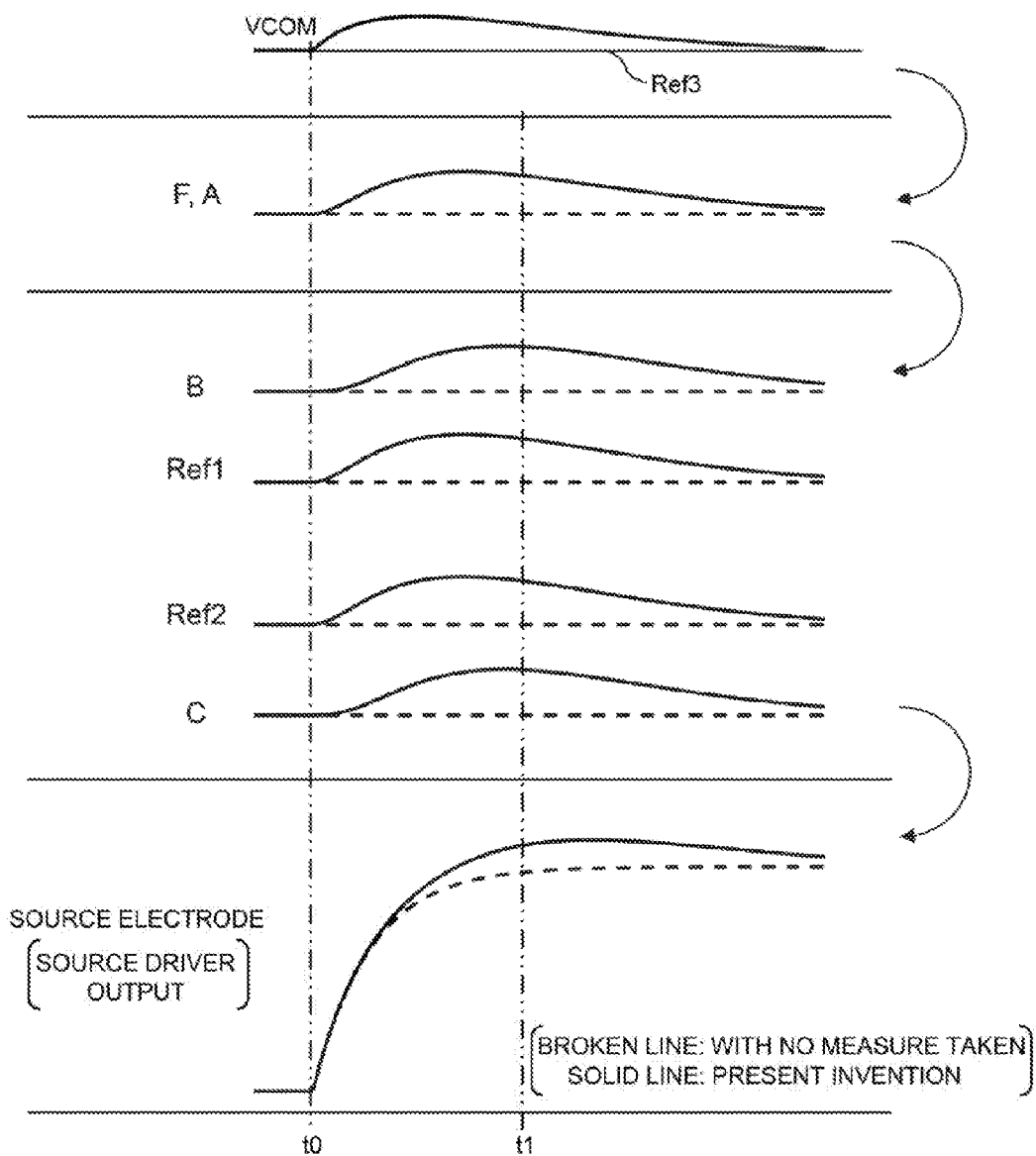
FIG. 8 is a waveform diagram showing, by example, an operation waveform in the circuit of FIG. 7.

The high-pass filter 60 extracts AC components of the potential fluctuation of the common voltage VCOM. The input amplifier 61 receives the AC components thus extracted, of which an output voltage Vsft is fed back to the intermediate node F of the reference voltage-producing circuit 64. The reference voltage-producing circuit 64 is operable to shift, by the shift voltage Vsft, the reference voltages Ref1 and Ref2 in the same direction, the reference voltage-producing circuit has series resistances R11 and R12 arranged between the current sources 62 and 63. Then, the reference node A is subjected to the same change as that in the reference voltages Refg1 and Ref2, which output voltages of the non-inverting amplifiers 30 and 31 depend on and consequently, output voltages of the non-inverting amplifiers 30 and 31 are both shifted by the shift voltage Vsft. The non-inverting amplifiers are used for a power source of a voltage-dividing circuit constituted by a series circuit of resistance arrays Re5. Therefore, division voltages provided by the voltage-dividing circuit can be made to follow the shift voltage Vsft, namely the fluctuation of the common voltage VCOM, and the voltage error between the common terminal 52 and data terminal 51 of each liquid crystal display element 50 can be corrected before the convergence of the common voltage VCOM. For instance, as shown in FIG. 8, at the time t0, a display line is selected and, drive signals are supplied to the relevant source electrodes, whereby each source electrode is driven and accordingly, the common voltage VCOM is fluctuated. At the time t1, the voltage of the source electrode has converged, whereas the common voltage VCOM larger than drive signals in driving load has not converged yet. At this time, the nodes F, A, B and C, and the reference voltages Ref1_A and Ref2_A vary while following the change in the common voltage VCOM. These changes are in proportion to a change of the common voltage VCOM with respect to a target voltage Ref3 of the common voltage. Therefore, the potential difference between the data terminal 51 and the common terminal 52, namely a voltage between the capacitance electrodes of the liquid crystal 54 is corrected as to the error attributed to the fluctuation of the common voltage VCOM and thus, the liquid crystal 54 is allowed to hold proper electric charge information. The input amplifier 61 is not required to have a particularly large driving ability. The input amplifier is sufficient so long as the amplifier can change and converge the voltages at the intermediate node F, the reference node A and the node D. Incidentally, the same shift voltage Vsft as supplied to the nodes F and A is provided to the node D and therefore, the arrangement like this contributes to the enhancement of the convergence of division voltages produced by the voltage-dividing circuit formed by the resistance arrays RS5 having the node D set at the center thereof in the event of the change in the shift voltage Vsft.

FIG. 9 shows a third specific example of the gradation voltage-producing circuit with its peripheral parts. The embodiment of FIG. 9 is different from the embodiment of FIG. 1 in that a quantity corresponding to the fluctuation of the common voltage VCOM is provided to a buffer amplifier for gamma correction as an offset. The gradation voltage-producing circuit 17_B has a voltage-to-current conversion circuit 70 which converts a difference voltage between an input common voltage VCOMS input from the common-voltage-input terminal 21, and a target voltage Ref3 of a common voltage VCOM output from the common-voltage-output terminal 22 into current. The current produced by the voltage-to-current conversion circuit is supplied to the buffer amplifiers 34_B for gamma correction. In each buffer amplifier 34_B, the current thus supplied is lead to flow a feedback route, thereby forming an offset voltage. This embodiment does not require that the reference voltages Ref1 and Ref2 of the non-inverting amplifiers 30 and 31, and the voltage at the reference node A be changed in proportion to the fluctuation of the common voltage VCOM. Therefore, the reference node A and the node Dare fixed to the ground potential, and the reference voltages Ref1 and Ref2 are each made a constant voltage.

Figure 10:
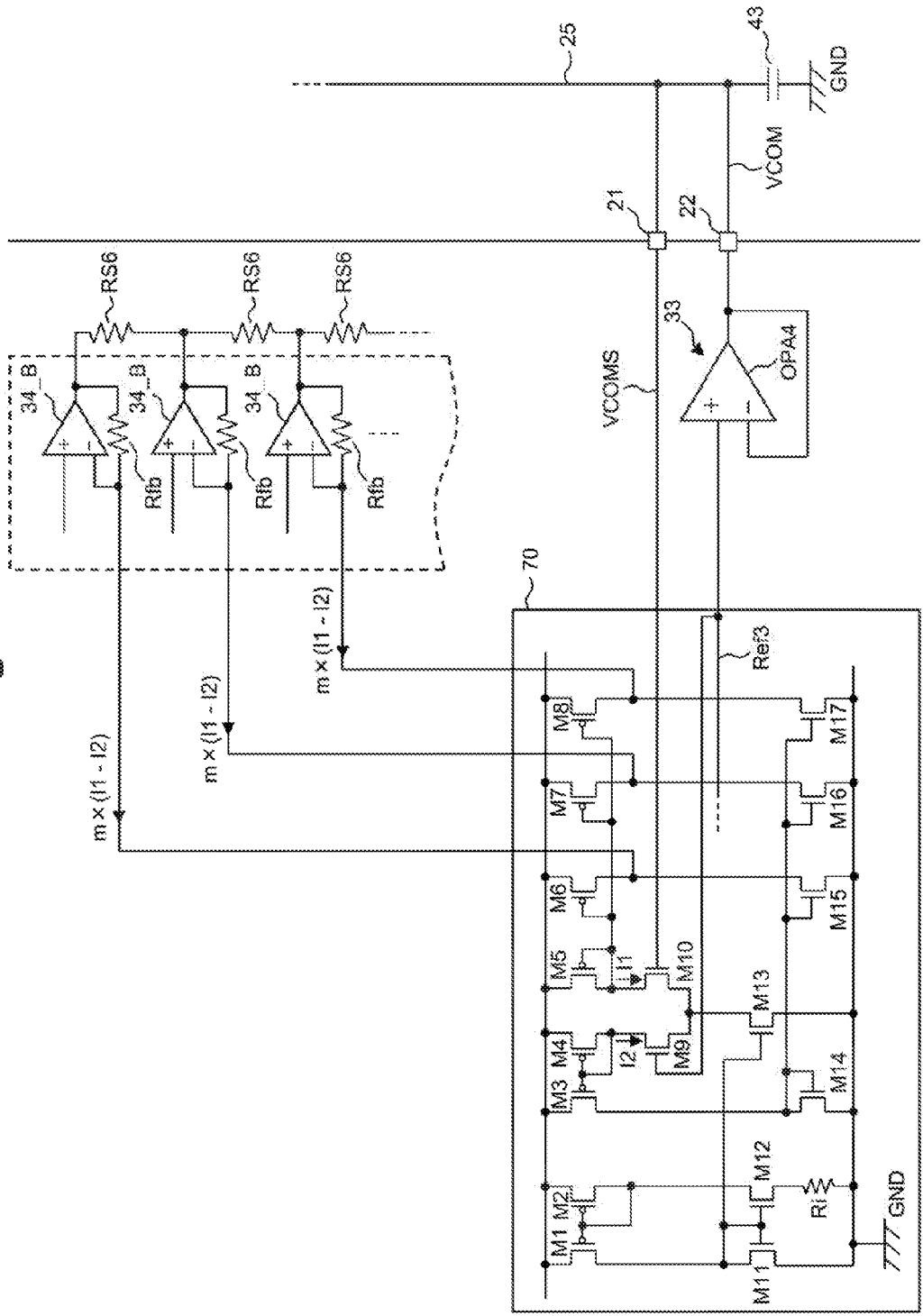
FIG. 10 is a circuit diagram showing a specific example of the voltage-to-current conversion circuit of FIG. 9.

FIG. 10 shows a specific example of the voltage-to-current conversion circuit 70. The voltage-to-current conversion circuit has a differential amplifier provided therein. The differential amplifier uses, as a current source, an n-channel type MOS transistor M13 receives, at its gate, a bias voltage formed by a bias circuit constituted by p-channel type MOS transistors M1 and M2, and n-channel type MOS transistors M11 and M12, and a resistance Ri. The differential amplifier receives the input common voltage VCOMS and the reference voltage Ref3 as differential inputs at n-channel type MOS transistors M10 and M9. Currents are caused to flow through p-channel type MOS transistors M3 to M8 and n-channel type MOS transistors M14 to M17 according to the differential inputs, whereby current m×(I1−I2) in proportion to the voltage difference between the input common voltage VCOMS and the reference voltage Ref3 is produced. The current m×(I1−I2) makes a conversion current resulting from a voltage-to-current conversion of the difference voltage between the input common voltage VCOMS and the reference voltage Ref3. The current of the bias circuit shown in FIG. 10 can be approximated to be $(1-\sqrt{k}) \times Vov1/R$ on condition that the MOS transistors work in their saturation regions, where "k" represents a current density ratio of the MOS transistors M11 and M12 used for the current source, Vov1 represents an over-drive voltage of the n-channel type MOS transistor used by the current source, and R represents a value of the resistance Ri used by the current source. The trans-conductance of the MOS transistors M9 and M10 forming a differential pair can be approximated to be 2×Bias current/Over-drive voltage. Therefore, the trans-conductance of the voltage-to-current conversion circuit 70 is given by $2 \times (1-\sqrt{k}) \times Vov1/(R \times Vov2)$, which is in proportion to 1/R, where Vov2 represents an over-drive voltage of the differential pair. The conversion current m×(I1−I2) is passed through the feedback resistance Rfb of each buffer amplifier 34_B and thus, converted into a voltage. The resultant voltage makes an offset of the buffer amplifier 34_B. The offset is arranged so that its value can be approximated by a device size ratio (current density ratio) of the MOS transistors used in the voltage-to-current conversion circuit and a resistance ratio of the resistance Ri of the voltage-to-current conversion circuit 70 and the feedback resistance Rfb, which makes easier to suppress the variation thereof.

With the gradation voltage-producing circuit 17_B, a voltage error applied between the common terminal 52 and the data terminal 51 of each liquid crystal display element 50 can be corrected because the offset formed by each buffer amplifier 34_B follows the difference voltage between the input common voltage VCOMS and the target voltage Ref3 of the common voltage. For instance, as shown in FIG. 11, at the time to, a display line is selected, and drive signals are supplied to the relevant source electrodes, whereby each source electrode is driven and accordingly, the common voltage VCOM is fluctuated. At the time t1, the voltage of the source electrode has converged, whereas the common voltage VCOM larger than drive signals in driving load has not converged yet. At this time, the offset of each buffer amplifier 34_B is varied according to the change in current passed through the feedback resistance Rfb of the buffer amplifier 34_B while following the change in the common voltage VCOM. The change in the offset is in proportion to a change of the common voltage VCOM relative to the target voltage Ref3 of the common voltage and as such, the potential difference between the data terminal 51 and the common terminal 52, namely the voltage between capacitance electrodes of the liquid crystal 54 is corrected about the error attributed to the fluctuation of the common voltage VCOM and thus, the liquid crystal 54 is allowed to hold proper electric charge information. It suffices to form an offset voltage of each buffer amplifier 34_B bypassing a current resulting from the voltage-to-current conversion of the difference voltage between the input common voltage VCOMS, and the target voltage Ref3 of the common voltage through the buffer amplifier. Therefore, this embodiment does not require a particularly large driving ability.

While the invention made by the inventor has been described above based on the embodiments specifically, the invention is not limited to the embodiments. It is obvious that various changes or modifications may be made without departing from the subject matter thereof.

For instance, a specific example on the principle of the solution of varying drive voltages in the direction of change in the common voltage is not limited to: the embodiment of FIG. 1 arranged so that drive voltages are changed by use of inverting amplifiers; the embodiment of FIG. 7 arranged so that a voltage making a reference for producing each drive voltage is shifted by inputting a voltage corresponding to a fluctuation of the common voltage from the outside; and the embodiment of FIG. 9 arranged so that each buffer amplifier is made to have an offset by converting a change of the common voltage into a current. It is possible to adopt other specific means. Further, as to the specific circuit configurations according to the embodiments of FIGS. 1, 7 and 9, various modifications may be made without departing from the subject matters thereof.

The invention is not limited to a display drive of a liquid crystal display panel, which can be applied to display driving for an electroluminescence panel and a plasma panel. Further, the driven device is not limited to a display panel.

What is claimed is:
1. A display driving device comprising:
    a drive voltage-producing circuit configured to produce a plurality of drive voltages;
    a driver circuit configured to accept input of the drive voltages produced by the drive voltage-producing circuit, and output, as drive signals, signals selected from the drive voltages according to drive data from a plurality of data output terminals in parallel; and
    a common voltage-producing circuit configured to produce a common voltage to output from a common-voltage-output terminal,
    wherein the drive voltage-producing circuit is configured to detect a change in the common voltage output from the common-voltage-output terminal and change the drive voltages to follow a direction of the change.
2. The display driving device according to claim 1 further comprising: a common-voltage-input terminal for accepting input of a common voltage output from the common-voltage-output terminal from outside the driving device and providing the common voltage to the drive voltage-producing circuit,
    wherein the drive voltage-producing circuit includes:
        a first non-inverting amplifier arranged so that a division voltage of an output voltage of the first non-inverting amplifier relative to a reference node voltage is fed back thereto; and
        a second non-inverting amplifier arranged so that a division voltage of its output voltage relative to the reference node voltage is fed back thereto, wherein the drive voltage-producing circuit is configured to produce drive voltages by division of a voltage between the output voltage of the first non-inverting amplifier and the output voltage of the second non-inverting amplifier; and
    wherein the drive voltage-producing circuit further includes an inverting amplifier which forms a correction voltage depending on a difference between an input common voltage input through the common-voltage-input terminal and a target voltage of the com- mon voltage output from the common-voltage-output terminal, and provides the correction voltage to the reference node.

3. The display driving device according to claim 1, further comprising: a common-voltage-input terminal configured to: accept input of a common voltage output from the common-voltage-output terminal from outside the driving device; and provide the common voltage to the drive voltage-producing circuit, wherein the drive voltage-producing circuit comprises:
a first non-inverting amplifier configured to amplify a first reference voltage in a non-inverting manner to output a first voltage, and whose feedback quantity is determined by a first voltage-dividing circuit provided between a reference node and an output terminal;
a second non-inverting amplifier configured to amplify a second reference voltage in a non-inverting manner to output a second voltage, and whose feedback quantity is decided by a second voltage-dividing circuit provided between the reference node and an output terminal;
a voltage-dividing circuit configured to generate, by division of a voltage between the first and second voltages, a plurality of division voltages to be used for producing drive voltages; and
an inverting amplifier configured to generate a correction voltage depending on a difference between an input common voltage input from the common-voltage-input terminal and a target voltage of a common voltage output from the common-voltage-output terminal, provided that an output of the inverting amplifier is connected to the reference node.

4. The display driving device according to claim 1, further comprising: a voltage input terminal configured to: accept input of a voltage corresponding to a fluctuation of a common voltage output from the common-voltage-output terminal from outside the driving device; and provide the voltage to the drive voltage-producing circuit, wherein the drive voltage-producing circuit includes:
a first non-inverting amplifier arranged so that a division voltage of an output voltage of the first non-inverting amplifier relative to a reference node voltage is fed back thereto;
a second non-inverting amplifier arranged so that a division voltage of an output voltage of the second non-inverting amplifier relative to the reference node voltage is fed back thereto;
a reference voltage-producing circuit configured to produce:
a reference voltage of the first non-inverting amplifier at an upstream node of an upstream side resistance located upstream of an intermediate node where a predetermined current is passed; and
reference voltage of the second non-inverting amplifier at a downstream node of a downstream side resistance located downstream of the intermediate node; and
an input amplifier configured to produce a shift voltage depending on the voltage corresponding to a fluctuation input from the voltage input terminal, wherein the shift voltage is applied to the intermediate node, thereby causing the respective reference voltages to reflect a voltage change at the intermediate node, wherein the shift voltage is applied to the reference node, thereby causing output voltages of the first and second non-inverting amplifiers to reflect a voltage change at the reference node, and
wherein the drive voltage-producing circuit is further configured to produce a plurality of drive voltages by division of a voltage between the output voltages of the first and second non-inverting amplifiers.

5. The display driving device according to claim 1, further comprising: a common-voltage-input terminal configured to: accept input of a voltage corresponding to fluctuation of a common voltage output from the common-voltage-output terminal from outside the driving device; and provide the voltage to the drive voltage-producing circuit, wherein the drive voltage-producing circuit comprises:
a reference voltage-producing circuit configured to produce:
a first reference voltage at an upstream node of an upstream side resistance located upstream of an intermediate node where a predetermined current is passed; and
a second reference voltage at a downstream node of a downstream side resistance located downstream of the intermediate node;
a first non-inverting amplifier configured to amplify the first reference voltage in a non-inverting manner to output a first voltage, and a feedback quantity of the first non-inverter amplifier is decided by a first voltage-dividing circuit provided between a reference node and an output terminal;
a second non-inverting amplifier configured to amplify the second reference voltage in a non-inverting manner to output a second voltage, and a feedback quantity of the second non-inverter amplifier is decided by a second voltage-dividing circuit provided between the reference node and an output terminal;
a voltage-dividing circuit configured to generate, by division of a voltage between the first and second voltages, a plurality of division voltages to be used for producing drive voltages; and
an input amplifier configured to: produce a shift voltage depending on a voltage of fluctuation input from the common-voltage-input terminal; and provide the shift voltage to the intermediate node and the reference node.

6. The display driving device according to claim 5, wherein the input amplifier is configured to further provide the shift voltage to an intermediate node of the voltage-dividing circuit.

7. The display driving device according to claim 1, further comprising: a common-voltage-input terminal configured to: accept input of a common voltage output from the common-voltage-output terminal from outside the driving device; and provide the common voltage to the drive voltage-producing circuit, wherein the drive voltage-producing circuit comprises:
a voltage-to-current conversion circuit configured to convert a difference voltage between an input common voltage input from the common-voltage-input terminal, and a target voltage of a common voltage output from the common-voltage-output terminal into current; and
a plurality of buffer amplifiers configured to form an offset voltage by passing therethrough a current resulting from conversion by the voltage-to-current conversion circuit is used, and
wherein the drive voltage-producing circuit is configured to produce, based on outputs of the plurality of buffer amplifiers, the plurality of drive voltages reflecting a difference voltage between the input common voltage and the target voltage.

8. The display device according to claim 1, further comprising:
a common-voltage-input terminal configured to accept input of a common voltage output from the common-voltage-output terminal from outside the driving device; and provide the common voltage to the drive voltage-producing circuit,
wherein the drive voltage-producing circuit comprises:
a voltage-to-current conversion circuit configured to convert a difference voltage between an input common voltage input from the common-voltage-input terminal and a target voltage of a common voltage output from the common-voltage-output terminal into a current;
a voltage-dividing circuit configured to produce a plurality of division voltages; and
a correction circuit configured to correct voltage curves according to a plurality of division voltages produced by the voltage-dividing circuit to produce the drive voltages,
wherein the correction circuit has a plurality of buffer amplifiers configured to receive the division voltages, and wherein each of the plurality of buffer amplifiers has a feedback route and is configured to form an offset voltage with a current produced by the voltage-to-current conversion circuit passed therethrough.

9. The display driving device according to claim 1, wherein the display driving device is configured to control a display device comprising a plurality of liquid crystal display elements.

10. A display driver for a display panel having a plurality of display elements arranged like a matrix, configured to receive a common voltage at common terminals and drive signals at data terminals, the display driver comprising:
a gradation voltage-producing circuit configured to produce a plurality of gradation voltages;
a driver circuit which configured to accept input of the plurality of gradation voltages produced by the gradation voltage-producing circuit and output, as drive signals, the gradation voltages selected according to display data from a plurality of data output terminals in parallel; and
a common voltage-producing circuit configured to produce a common voltage output from a common-voltage-output terminal,
wherein the gradation voltage-producing circuit is configured to detect a change in a common voltage output from the common-voltage-output terminal and vary the gradation voltages to follow a direction of the change.

11. The display driver according to claim 10, further comprising: a common-voltage-input terminal configured to: accept input of a common voltage output from the common-voltage-output terminal from outside the display driver; and provide the common voltage to the gradation voltage-producing circuit,
wherein the gradation voltage-producing circuit comprises:
a first non-inverting amplifier arranged so that a division voltage of its output voltage relative to a reference node voltage is fed back thereto;
a second non-inverting amplifier arranged so that a division voltage of its output voltage relative to the reference node voltage is fed back thereto; and
an inverting amplifier configured to form a correction voltage corresponding to a difference between an input common voltage input from the common-voltage-input terminal, and a target voltage of a common voltage output from the common-voltage-output terminal, and provides the correction voltage to the reference node, wherein the gradation voltage-producing circuit is configured to produce the plurality of gradation voltages by division of a voltage between the output voltage of the first non-inverting amplifier and the output voltage of the second non-inverting amplifier.

12. The display driver according to claim 10, further comprising: a voltage input terminal configured to: accept input of a voltage corresponding to a fluctuation of a common voltage output from the common-voltage-output terminal from outside the display driver; and provide the input voltage to the gradation voltage-producing circuit,
wherein the gradation voltage-producing circuit includes:
a first non-inverting amplifier arranged so that a division voltage of its output voltage relative to a reference node voltage is fed back thereto,
a second non-inverting amplifier arranged so that a division voltage of its output voltage relative to the reference node voltage is fed back thereto
a reference voltage-producing circuit configured to: produce a reference voltage of the first non-inverting amplifier at an upstream node of an upstream side resistance located upstream of an intermediate node where a predetermined current is passed; and produce a reference voltage of the second non-inverting amplifier at a downstream node of a downstream side resistance downstream of the intermediate node; and
an input amplifier configured to produce a shift voltage depending on a change of a voltage of fluctuation input from the voltage input terminal, wherein the shift voltage is applied to the intermediate node, thereby causing the reference voltages to reflect a voltage change at the intermediate node, and the shift voltage is applied to the reference node, thereby causing output voltages of the first and second non-inverting amplifiers to reflect a voltage change at the reference node, and wherein the gradation voltage-producing circuit is configured to produce the plurality of gradation voltages by division of a voltage between the output voltage of the first non-inverting amplifier and the output voltage of the second non-inverting amplifier.

13. The display driver according to claim 10, further comprising: a common-voltage-input terminal configured to: accept input of a common voltage output from the common-voltage-output terminal from outside the display driver and provide the common voltage to the gradation voltage-producing circuit,
wherein the gradation voltage-producing circuit comprises: a voltage-to-current conversion circuit configured to convert a difference voltage between an input common voltage input from the common-voltage-input terminal, and a target voltage of a common voltage output from the common-voltage-output terminal into current; and
a plurality of buffer amplifiers on which an offset voltage formed by passing therethrough a current resulting from conversion by the voltage-to-current conversion circuit is used, and
the gradation voltage-producing circuit is further configured to produce, based on outputs of the plurality of buffer amplifiers, the plurality of drive voltages each reflecting a difference voltage between the input common voltage and the target voltage.

14. The display driver according to claim 10, wherein the plurality of display elements comprises a plurality of liquid crystal display elements.

15. An electronic apparatus comprising:
a driven device having a plurality of driven elements arranged to commonly receive a common voltage at common terminals and individually receive drive signals at data terminals; and
a driving device used configured for drive control of the driven device,
wherein the driving device comprises:
   a drive voltage-producing circuit configured to produce drive voltages having plurality of levels;
   a driver circuit configured to accept input of the plurality of drive voltages produced by the drive voltage-producing circuit, and output, as drive signals, drive voltages selected according to drive data in parallel from a plurality of data output terminals; and
   a common voltage-producing circuit configured to produce a common voltage to be output from a common-voltage-output terminal,
   wherein the drive voltage-producing circuit is configured to: detect a change in a common voltage output from the common-voltage-output terminal; and change the drive voltages to follow a direction of the change.

16. The electronic apparatus according to claim 15, further comprising: a common-voltage-input terminal configured to: accept input of a common voltage output from the common-voltage-output terminal from outside the driving device; and provide the common voltage to the drive voltage-producing circuit,
   wherein the drive voltage-producing circuit includes:
      a first non-inverting amplifier arranged so that a division voltage of its output voltage relative to a reference node voltage is fed back thereto;
      a second non-inverting amplifier arranged so that a division voltage of its output voltage relative to the reference node voltage is fed back thereto;
      an inverting amplifier configured to form: a correction voltage corresponding to a difference between an input common voltage input from the common-voltage-input terminal; and a target voltage of a common voltage output from the common-voltage-output terminal wherein the drive voltage-producing circuit is configured to produce gradation voltages having a plurality of levels by division of a voltage between the output voltage of the first non-inverting amplifier and the output voltage of the second non-inverting amplifier, and wherein the correction voltage is provided to the reference node.

17. The electronic apparatus according to claim 15, further comprising: a voltage input terminal configured to: accept input of a voltage corresponding to a fluctuation of a common voltage output from the common-voltage-output terminal from outside the driving device; and provide the voltage to the drive voltage-producing circuit,
   wherein the drive voltage-producing circuit comprises:
      a first non-inverting amplifier arranged so that a division voltage of its output voltage relative to a reference node voltage is fed back thereto;
      a second non-inverting amplifier arranged so that a division voltage of its output voltage relative to the reference node voltage is fed back thereto;
      a reference voltage-producing circuit configured to: produce a reference voltage of the first non-inverting amplifier at an upstream node of an upstream side resistance located upstream of an intermediate node where a predetermined current is passed; and produce a reference voltage of the second non-inverting amplifier at a downstream node of a downstream side resistance downstream of the intermediate node; and
      an input amplifier configured to produce a shift voltage depending on a change of a voltage of the fluctuation input from the voltage input terminal,
   wherein the shift voltage is applied to the intermediate node, thereby causing the reference voltages to reflect a voltage change at the intermediate node, and
   the shift voltage is applied to the reference node, thereby causing output voltages of the first and second non-inverting amplifiers to reflect a voltage change at the reference node, and wherein the drive voltage-producing circuit is configured to produce a plurality of gradation voltages by division of a voltage between the output voltage of the first non-inverting amplifier and the output voltage of the second non-inverting amplifier.

18. The electronic apparatus according to claim 15, further comprising: a common-voltage-input terminal configured to: accept input of a common voltage output from the common-voltage-output terminal from outside the driving device; and provide the common voltage to the drive voltage-producing circuit,
   wherein the drive voltage-producing circuit comprises:
      a voltage-to-current conversion circuit configured to convert a difference voltage between an input common voltage input from the common-voltage-input terminal, and a target voltage of a common voltage output from the common-voltage-output terminal into a current; and
      a plurality of buffer amplifiers on which an offset voltage formed by passing therethrough a current resulting from conversion by the voltage-to-current conversion circuit is used, and
   the drive voltage-producing circuit is configured to produce, based on outputs of the plurality of buffer amplifiers, a plurality of drive voltages reflecting a difference voltage between the input common voltage and the target voltage.

19. The electronic apparatus according to claim 15, wherein the plurality of driven elements comprises a plurality of liquid crystal display elements.

20. The display driver according to claim 19, wherein the plurality of liquid crystal display elements include pixels configured to receive gradation voltages from the drive voltage-producing circuit.

* * * * *

UNITED STATES PATENT AND TRADEMARK OFFICE
CERTIFICATE OF CORRECTION

PATENT NO. : 9,983,454 B2
APPLICATION NO. : 15/096095
DATED : May 29, 2018
INVENTOR(S) : Shigeyuki Okabe Page 1 of 1

It is certified that error appears in the above-identified patent and that said Letters Patent is hereby corrected as shown below:

In Column 23 Line 6, in Claim 8, after "configured to" insert -- : --.

In Column 24 Line 22, in Claim 12, delete "thereto," and insert -- thereto; --, therefor.

In Column 24 Line 25, in Claim 12, after "thereto" insert -- ; --.

In Column 25 Line 12, in Claim 15, after "device" delete "used configured".

In Column 25 Line 47, in Claim 16, after "terminal" insert -- , --.

Signed and Sealed this
Twenty-first Day of August, 2018

Andrei Iancu
*Director of the United States Patent and Trademark Office*